(12) United States Patent
Ogino

(10) Patent No.: US 11,743,577 B2
(45) Date of Patent: Aug. 29, 2023

(54) IMAGE CAPTURING APPARATUS, METHOD THEREOF, AND STORAGE MEDIUM

(71) Applicant: CANON KABUSHIKI KAISHA, Tokyo (JP)

(72) Inventor: Masaya Ogino, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/445,746

(22) Filed: Aug. 24, 2021

(65) Prior Publication Data

US 2022/0070366 A1 Mar. 3, 2022

(30) Foreign Application Priority Data

Aug. 28, 2020 (JP) .............................. JP2020-144874

(51) Int. Cl.

| | |
|---|---|
| *H04N 23/60* | (2023.01) |
| *G01J 3/28* | (2006.01) |
| *H04N 23/62* | (2023.01) |
| *H04N 23/695* | (2023.01) |
| *H04N 23/63* | (2023.01) |

(52) U.S. Cl.
CPC ............ *H04N 23/64* (2023.01); *G01J 3/2823* (2013.01); *H04N 23/62* (2023.01); *H04N 23/695* (2023.01); *H04N 23/63* (2023.01)

(58) Field of Classification Search
CPC ...... H04N 23/64; H04N 23/62; H04N 23/695; H04N 23/63; H04N 23/80; H04N 23/687; G01J 3/2823; G01J 3/0229; G01J 3/14; G01J 3/18; G01J 2003/1226; G01J 2003/1239; G01J 2003/2826; G01J 3/0205

See application file for complete search history.

(56) References Cited

U.S. PATENT DOCUMENTS

| | | | |
|---|---|---|---|
| 2007/0002159 A1* | 1/2007 | Olsen ..................... | G03B 35/18 |
| | | | 348/335 |
| 2008/0251873 A1* | 10/2008 | Kasano ............. | H01L 27/14621 |
| | | | 257/E31.127 |
| 2017/0026588 A1* | 1/2017 | Kester ................... | G01J 5/0804 |

(Continued)

FOREIGN PATENT DOCUMENTS

| | | |
|---|---|---|
| JP | 03-282417 A | 12/1991 |
| JP | 2011-089895 A | 5/2011 |
| JP | 2012-044519 A | 3/2012 |

*Primary Examiner* — Hung H Lam

(74) *Attorney, Agent, or Firm* — Cowan, Liebowitz & Latman, P.C.

(57) ABSTRACT

An image capturing apparatus comprises an image sensor that receives beams of reflected light from a subject incident via an imaging optical system whose wavelength that reaches a light-receiving surface is different in accordance with an angle of incidence of reflected light, and generates an image signal. The apparatus changes a state of the imaging optical system or the image sensor such that a second image signal is generated by beams for which the angle of incidence of the reflected light from the imaging optical system is different from the beams by which a first image signal is generated. The apparatus outputs a spectral image based on a plurality of the image signals generated by receiving the beams in different state of the imaging optical system or the image sensor.

15 Claims, 18 Drawing Sheets

(56) References Cited

U.S. PATENT DOCUMENTS

2020/0065326 A1* 2/2020 Noro ................ G01N 21/27
2021/0338090 A1* 11/2021 Houck ............. A61B 5/02154
2022/0368865 A1* 11/2022 Yako ................ H04N 23/58

* cited by examiner

FIG. 5
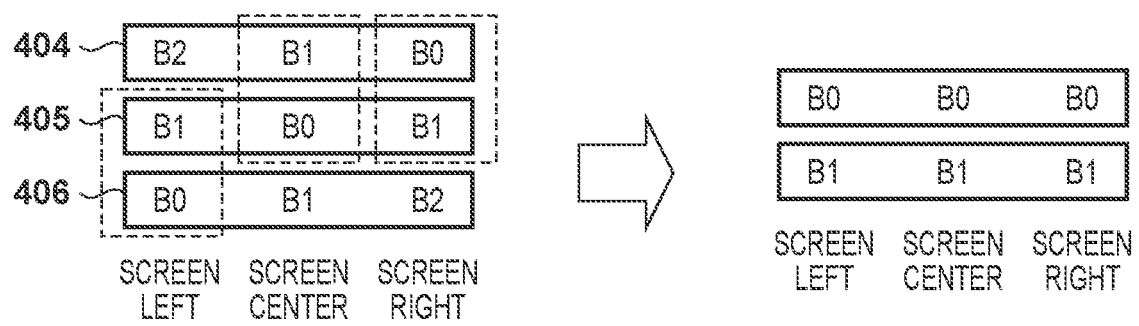
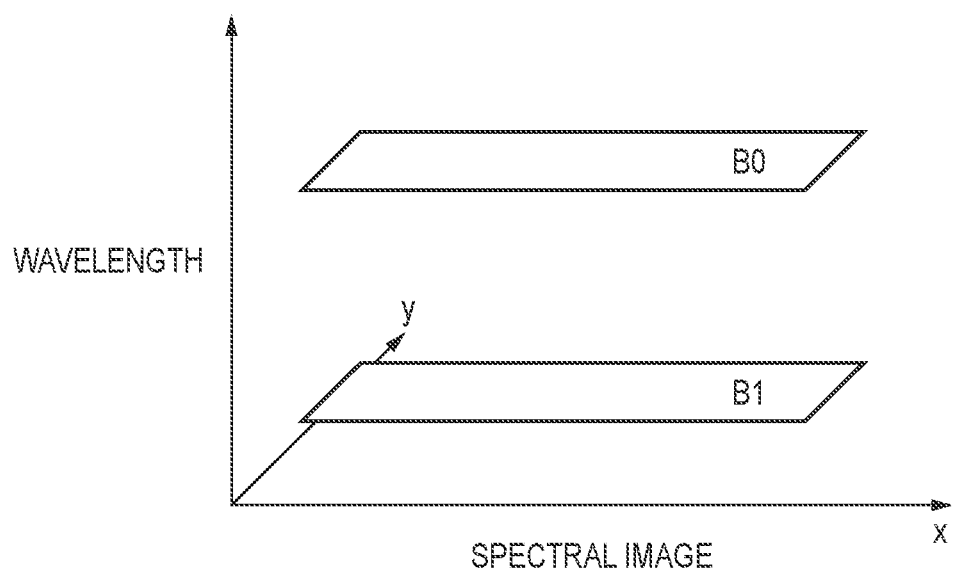

$(d+f) : S_b = f : S_1$ $S_1 = \dfrac{f \cdot S_b}{d+f}$

PUPIL DISTANCE OF IMAGING OPTICAL SYSTEM: f
SUBJECT DISTANCE: d
IMAGING OPTICAL SYSTEM SHIFT AMOUNT: $S_1$
MOVEMENT AMOUNT OF IMAGE CAPTURING APPARATUS: $S_b$ $d + S_{b2} = f : S_1$ $S_1 = \dfrac{f \cdot S_{b2}}{d}$ PUPIL DISTANCE OF IMAGING OPTICAL SYSTEM: f
SUBJECT DISTANCE: d
SHIFT AMOUNT OF OPTICAL AXIS AND CENTER OF CROP REGION: $S_1$
MOVEMENT AMOUNT OF IMAGE CAPTURING APPARATUS: $S_{b2}$

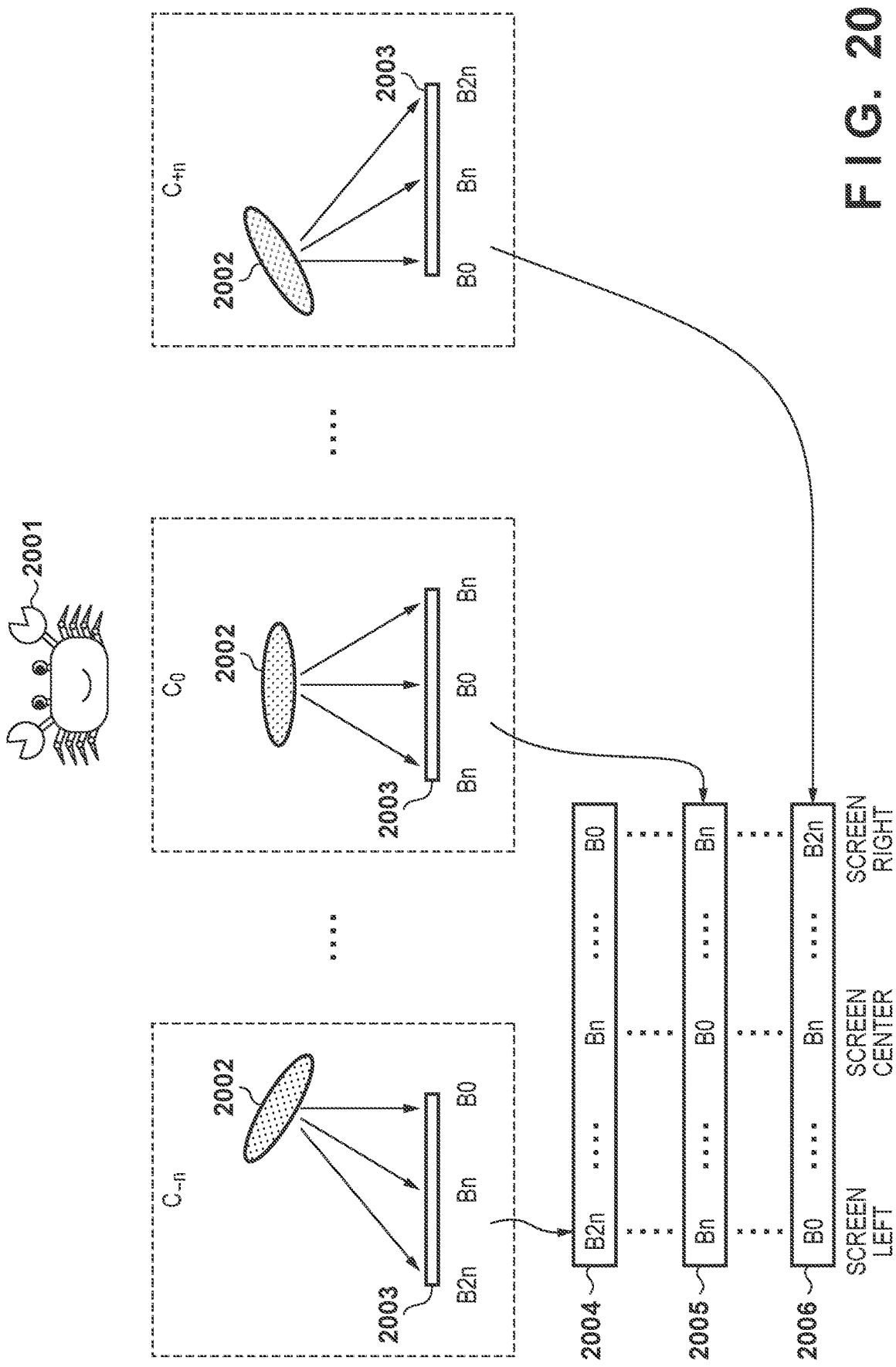

IMAGE CAPTURING APPARATUS, METHOD THEREOF, AND STORAGE MEDIUM

BACKGROUND OF THE INVENTION

Field of the Invention

The present invention relates to an image capturing apparatus, a method thereof, and a storage medium.

Description of the Related Art

Conventionally, a configuration in which color filters having different transmission wavelength bands, R, G, and B, have been arranged on pixels in a mosaic pattern has been widely used as a configuration of an image sensor for shooting color images. Although it is possible to obtain three wavelength bands, R, G, and B with such an image sensor, there is a problem that detailed spectral information cannot be obtained. More specifically, in a color image outputted from the above-described image sensor, it is impossible to distinguish, in the R band, light of a region close to infrared and light close to the G band, for example. In other words, in a color image, most of the information that a reflected light spectrum has is lost.

As a technique for obtaining spectral information of a subject, an image sensor in which color filters of transmission wavelengths are arranged in a mosaic pattern in addition to R, G, and B has been proposed (Japanese Patent Laid-Open No. 2012-44519). Also, a technique in which a prism or diffraction grating is arranged in front of a two-dimensional image sensor and with one dimension as spatial information (image) and another dimension as spectral information (spectrum) and line scanning is performed spatially as a one-dimensional image sensor is known as another technique for acquiring spectral information (Japanese Patent Laid-Open No. 2011-89895). Cameras that use this technique are called push-broom multispectral cameras. Although this technique does not sacrifice spatial resolution in order to acquire spectral information, it requires a system that can perform accurate line scanning.

Furthermore, in order to obtain spectral information of a subject, a technique in which a variable bandpass filter, which uses a change in retardation of a liquid crystal caused by changing a voltage applied to the liquid crystal, is arranged in front of an optical system or image sensor has been proposed (Japanese Patent Laid-Open No. H3-282417).

In the image sensor proposed in Japanese Patent Laid-Open No. 2012-44519, there is a trade-off relation between wavelength resolution (the number of bands) and spatial resolution (resolution) such that spatial resolution of an image in each band decreases as variation of wavelength band is increased; accordingly, there is a problem of achieving both the number of bands and resolution.

Also, the so-called push-broom apparatus proposed in Japanese Patent Laid-Open No. 2011-89895 may increase in size or require additional configuration elements for accurately scanning a subject. Furthermore, in the technique proposed in Japanese Patent Laid-Open No. H3-282417 in which a bandpass characteristic of a liquid crystal filter is changed, capturing needs to be performed for each polarized light of one direction, whereby there is a problem that the apparatus increases in size and it takes time (e.g., several hundred milliseconds) to change a transmission wavelength.

SUMMARY OF THE INVENTION

The present disclosure has been made in consideration of the aforementioned issues, and realizes a technique that can reduce limitations on wavelength resolution (the number of bands) and acquire spectral information using a simple configuration.

In order to solve the aforementioned problems, one aspect of the present disclosure provides an image capturing apparatus comprising: an image sensor configured to receive beams of reflected light from a subject incident via an imaging optical system whose wavelength that reaches a light-receiving surface is different in accordance with an angle of incidence of reflected light, and generate an image signal; one or more processors; and a memory configured to store instructions which, when the instructions are executed by the one or more processors, cause the image capturing apparatus to function as: a control unit that changes a state of the imaging optical system or the image sensor such that a second image signal is generated by beams for which the angle of incidence of the reflected light from the imaging optical system is different from the beams by which a first image signal is generated; and an output unit that outputs a spectral image based on a plurality of the image signals generated by receiving the beams in each state of the imaging optical system or the image sensor changed by the control unit.

Another aspect of the present disclosure provides a method of controlling an image capturing apparatus that includes an image sensor operable to receive beams whose wavelength that reaches a light-receiving surface is different in accordance with an angle of incidence of reflected light among the reflected light from a subject incident via an imaging optical system, and generate an image signal, the method comprising: controlling to change a state of the imaging optical system or the image sensor such that a second image signal is generated by beams whose angle of incidence of the reflected light from the imaging optical system is different from beams by which a first image signal is generated; and outputting a spectral image based on a plurality of the image signals generated by receiving the beams in each state of the imaging optical system or the image sensor changed by the control unit.

Still another aspect of the present disclosure provides a non-transitory computer-readable storage medium comprising instructions for performing a method of controlling an image capturing apparatus that includes an image sensor operable to receive beams whose wavelength that reaches a light-receiving surface is different in accordance with an angle of incidence of reflected light among the reflected light from a subject incident via an imaging optical system, and generate an image signal, the method comprising: controlling to change a state of the imaging optical system or the image sensor such that a second image signal is generated by beams whose angle of incidence of the reflected light from the imaging optical system is different from beams by which a first image signal is generated; and outputting a spectral image based on a plurality of the image signals generated by receiving the beams in each state of the imaging optical system or the image sensor changed by the control unit.

According to the present invention, it is possible to reduce limitation on wavelength resolution (the number of bands) and obtain spectral information using a simple configuration.

Further features of the present invention will become apparent from the following description of exemplary embodiments (with reference to the attached drawings).

BRIEF DESCRIPTION OF THE DRAWINGS

FIG. 5 is a view (2) describing an overview for acquisition of a spectral image according to the first embodiment.

FIG. 20 is a view describing acquisition of a spectral image according to the third embodiment.

DESCRIPTION OF THE EMBODIMENTS

First Embodiment

Figure 1:
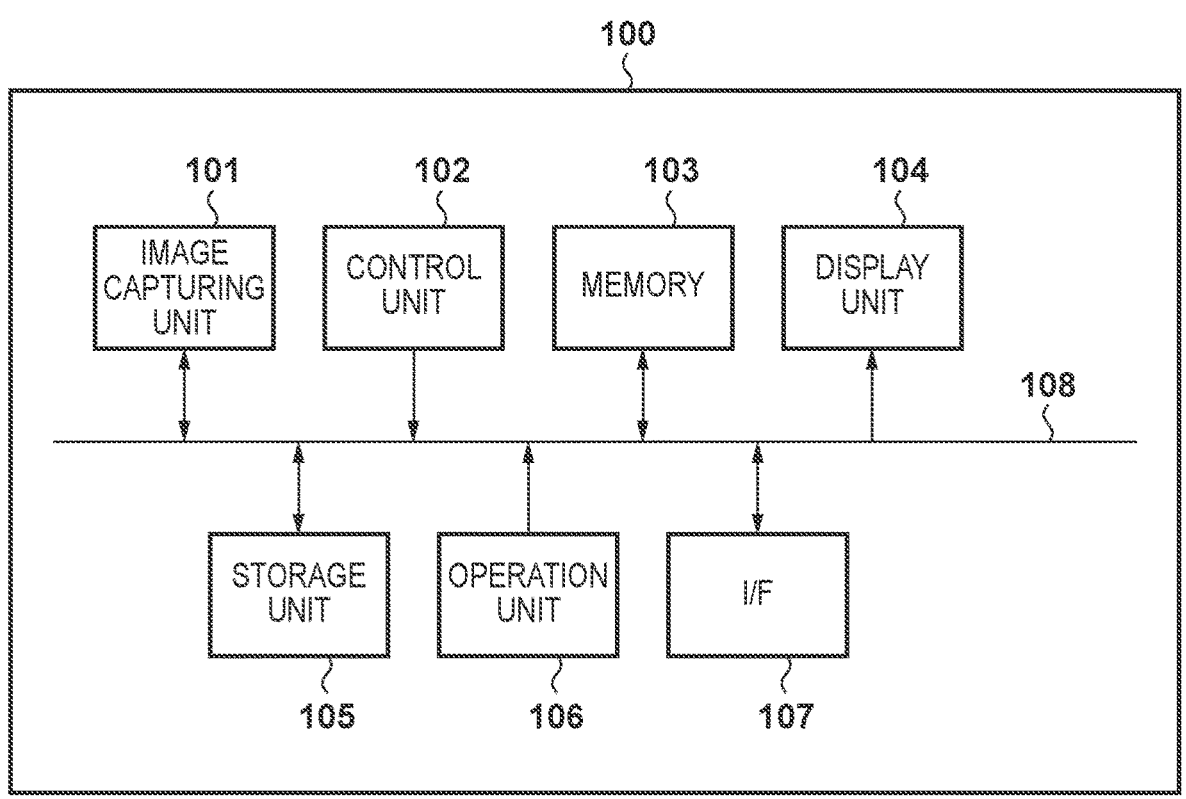
FIG. 1 is a block diagram illustrating an example of a functional configuration of a digital camera as an example of an image capturing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following, description will be given using an example of a case where an image capturing apparatus is a digital camera having an image capturing unit according to the present embodiment. However, the present embodiment is not limited to a digital camera and may be applied to other devices in which the same image capturing unit can be comprised. Such devices may include, for example, a mobile telephone such as a smartphone, a gaming device, a tablet terminal, a medical device, an electronic equipment of a monitoring system or in-vehicle system, and the like.

(Configuration of Image Capturing Apparatus)

FIG. 1 illustrates an example of a functional configuration of an image capturing apparatus 100 according to the present embodiment. The image capturing apparatus 100 includes each element to be described below such as an image capturing unit 101, a control unit 102, a memory 103, a display 104, a storage unit 105, and an operation unit 106.

The image capturing unit 101 includes an imaging optical system and an image sensor such as a CCD (Charge-Coupled Device) image sensor, a CMOS (Complementary Metal Oxide Semiconductor) image sensor, or the like. The image sensor outputs a pixel signal, which is an optical image of a subject formed by an imaging optical system photo-electrically converted in each pixel. Also, the image capturing unit 101 further includes a driving apparatus for changing the positions of the imaging optical system and the image sensor relative to each other (e.g., change a positional relationship of an optical axis of the imaging optical system and a center position of the image sensor). The driving apparatus, for example, changes the position of the imaging optical system but may also change the position of the image sensor or the positions of both the imaging optical system and the image sensor. Regarding the image capturing unit 101, an optical element such as a multilayer film or photonic crystal having an incidence angle dependence is arranged in or directly over the image sensor. Note that in the example illustrated in FIG. 1, description is given using an example of a case where each element such as the imaging optical system is included in the image capturing unit 101; however any of each element of the image capturing unit 101 may be separated from the image capturing unit 101. Details on outputted image signals and configuration elements of the image capturing unit 101 will be described later.

The control unit 102 includes one or more processors such as a CPU, an MPU, and the like and may be an integrated circuit in which a plurality of types of processor such as a CPU and an ASIC have been provided. The control unit 102 controls the entire image capturing apparatus 100 by deploying in the memory 103 programs stored in the storage unit 105 and executing these. The programs include programs for various processes for controlling each unit of the control unit 102 and image capturing processing to be described later. The memory 103 includes a volatile semiconductor memory such as a DRAM or the like and provides a work area for when the control unit 102 executes various processes.

The display 104 includes, for example, a liquid crystal or organic EL panel and displays a user interface for operation of the image capturing apparatus 100, an image being shot, a captured image stored in the storage unit 105, and the like. The storage unit 105 includes, for example, a hard disk drive (HDD), a solid state drive (SSD), or the like and stores programs, such as applications and libraries, captured images, and the like.

The operation unit 106 includes switches for inputting various operations related to shooting such as a power button, a still image recording button, a button for instructing to start or stop moving image recording, and the like. Also, the operation unit 106 may include a menu display button and a decision button as well as a cursor key, a pointing device, a touch panel, and the like and when these switches or keys are operated by a user, transmits an operation signal to the control unit 102.

A network interface 107 (also simply referred to as I/F 107) transmits and receives data to and from other external apparatuses via, for example, wireless communication such as a wireless LAN. A system bus 108 is configured by an address bus, a data bus, and a control bus for connecting between each unit of the above-described image capturing apparatus 100.

(Overview for Acquisition of Spectral Image)

Next, an overview for acquisition of image data (hereinafter, also referred to as spectral image) comprising spectral information will be described.

Figure 2A:
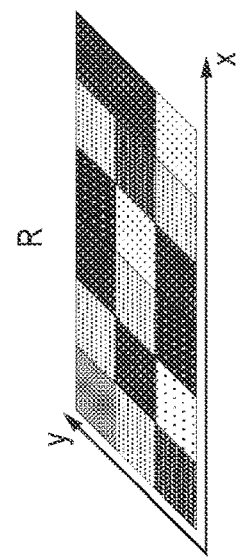
FIGS. 2AA to 2AC are views describing a color image.
Figure 2A:
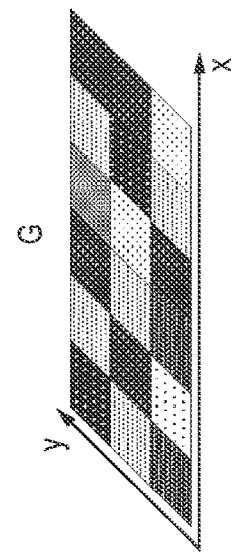
Figure 2A:
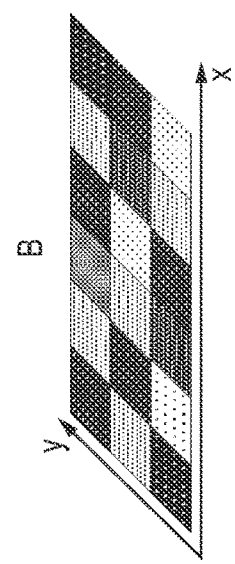

First, a spectral image according to the present embodiment will be described with reference to FIGS. 2AA to FIG. 2B and the like. In FIGS. 2AA to 2AC, a typical color image consisting of each color of R, G, and B is schematically illustrated. FIG. 2AA represents an R output, FIG. 2AB represents a G output, and FIG. 2AC represents a B output. The gradation of the fills represents the magnitude of an output. Each pixel is arranged at a respective position in x and y spatial coordinates, and each pixel comprises a respective value. The color and brightness of each pixel is defined by a combination of R, G, and B outputs. Each image of R, G, and B has a value that corresponds to x and y spatial coordinates and therefore is a combination of three things which constitutes three-dimensional data (an x-coordinate, a y-coordinate, and a signal value).

Figure 2B:
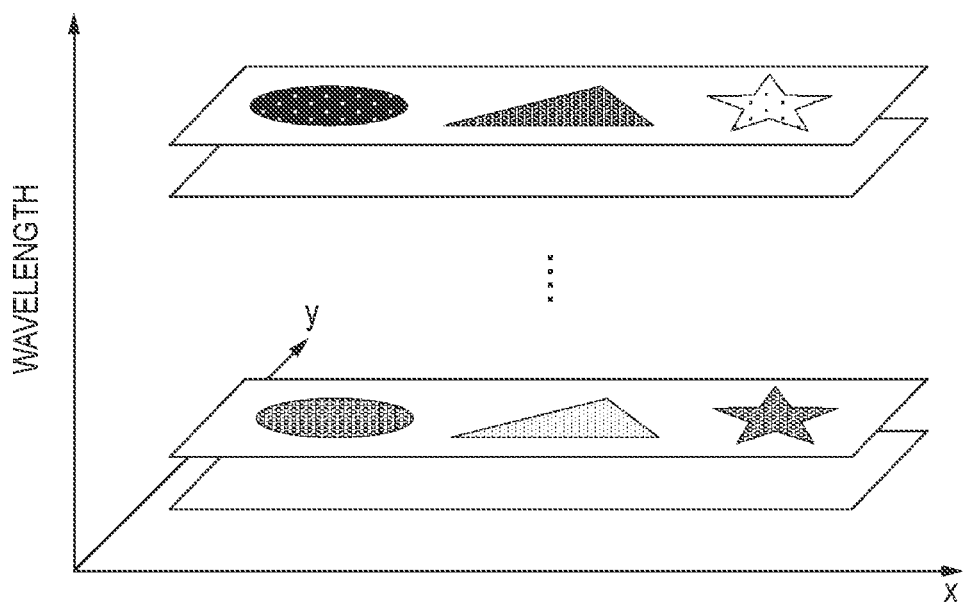
FIG. 2B is a view describing a spectral image.

Next, in FIG. 2B spectral image is schematically illustrated. Each pixel is arranged at a respective position in x and y spatial coordinates, and each pixel has a respective value at each wavelength. In other words, in a spectral image, each pixel has a value on a three-dimensional coordinate consisting of a spatial coordinate and wavelength. Accordingly, a spectral image is four-dimensional data (an x-coordinate, a y-coordinate, a wavelength, and a signal value) having a signal value for each unit specified by a spatial coordinate, which corresponds to a light-receiving surface, and wavelength.

Next, an angular dependency of a characteristic of an optical element related to the imaging optical system of the present embodiment will be described. Regarding an element for controlling an optical characteristic by a microstructure such as a multilayer film (e.g., a dielectric multilayer film) diffraction grating, photonic crystal, or plasmonic crystal, a characteristic thereof has an angular dependency due to a relation between a microstructure and an angle of incidence of a beam.

Figure 3:
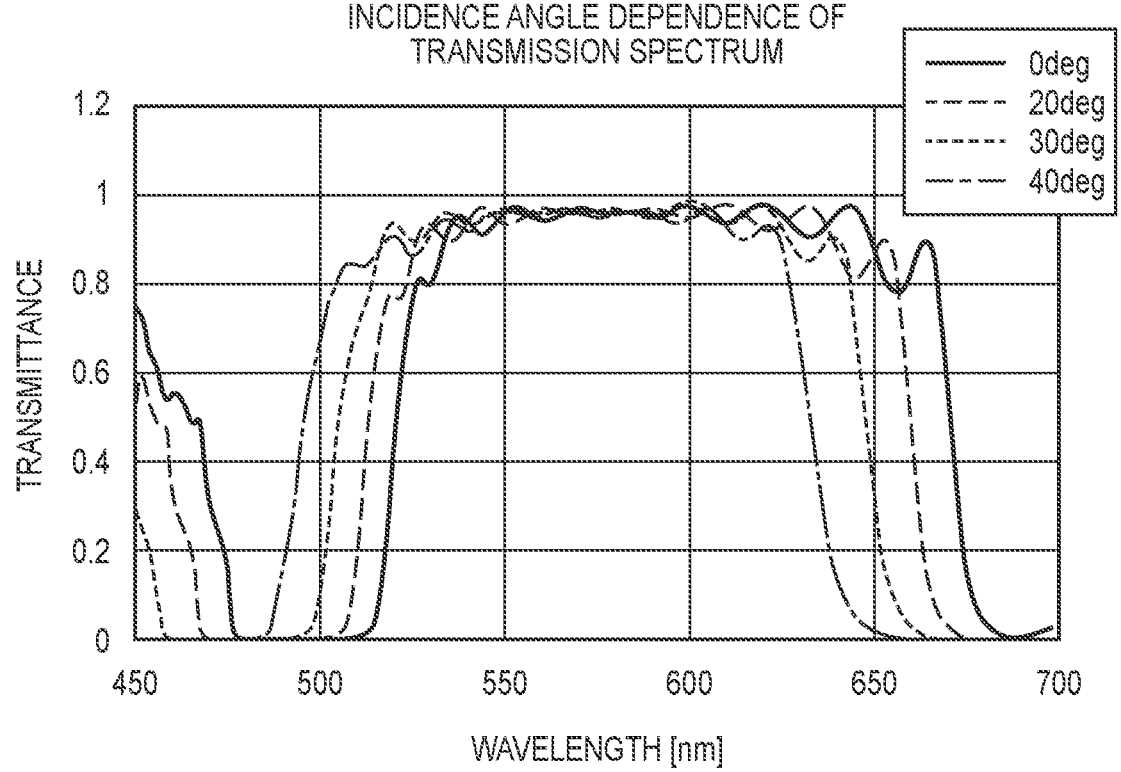
FIG. 3 is a view describing an angular dependency of a transmission characteristic of an optical element.

FIG. 3 illustrates a result of calculating an incidence angle dependence of a transmission characteristic of a multilayer film filter on which, for example, SiO 2 (300 nm) and TiO 2 (100 nm) have been alternatingly stacked for 10 periods. Regarding s polarized light and p polarized light at the time of oblique incidence, equal amounts have been added. Assuming that a condition in which a perpendicular incidence on a multilayer film is 0°, it is recognized that a transmission band shifts to a short wavelength side as the angle of incidence changes from 0° to 40°.

Note that by designing the number of films, thickness, and a refractive index of a material of the multilayer film, it is possible to control a band and a bandwidth of light to be transmitted. A photonic crystal and plasmonic crystal having a two- or three-dimensional structure has more freedom in design compared to a multilayer film modulated only in a one-dimensional direction.

Figure 4:
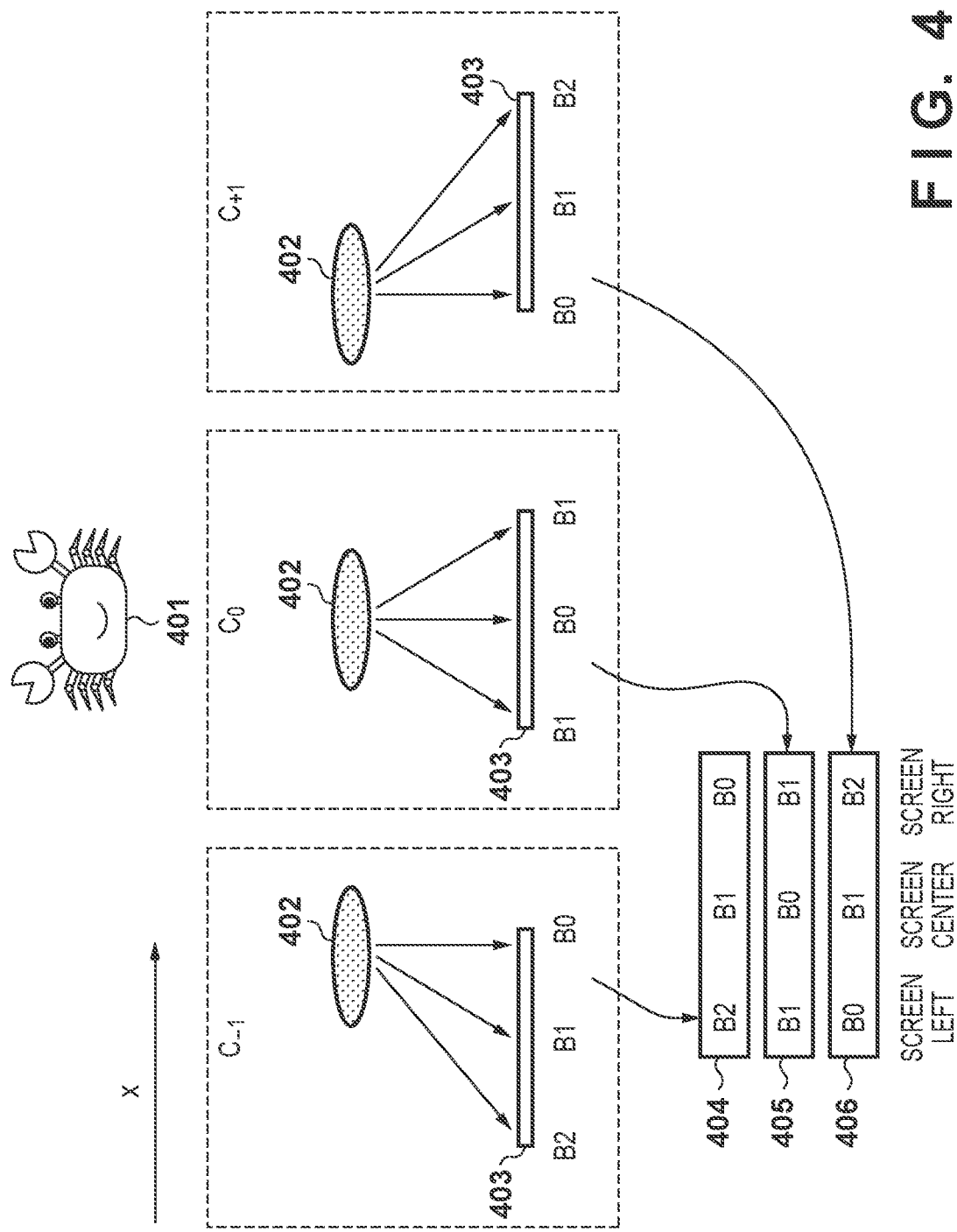
FIG. 4 is a view (1) describing an overview for acquisition of a spectral image according to a first embodiment.

The acquisition of a spectral image according to the present embodiment will be described with reference to FIG. 4. A reference numeral 402 is an imaging optical system and a reference numeral 403 is an image sensor, and they respectively correspond to the imaging optical system and the image sensor included in the image capturing unit 101. In FIG. 4, situations in which optical arrangements of the imaging optical system 402 and the image sensor 403 with respect to a subject 401 are different are represented as $C_{-1}$, $C_0$, and $C_{+1}$. Regarding $C_{-1}$, $C_0$, and $C_{+1}$, the optical axis of the imaging optical system and the center position of the image sensor are in a relation in which they have been shifted to the left or right of the imaging surface. The imaging optical system and the image sensor in $C_{-1}$, $C_0$, and $C_{+1}$ have been shifted so as to maintain a positional relationship in which the subject 401 does not change in position within the imaging surface to be shot.

Assume that images acquired by the image sensor 403 in the respective states of $C_{-1}$, $C_0$, and $C_{+1}$ are an image 404, an image 405, and an image 406, respectively. In a case where the optical position is $C_{-1}$, an angle of incidence of a beam on the image sensor 403 increases as it goes further to the left of the imaging surface. As described above, regarding an element for controlling an optical characteristic by a microstructure such as a multilayer film or photonic crystal, transmission characteristics are dependent on an angle of incidence. Accordingly, in a case where a multilayer film, photonic crystal, or the like is arranged in the image sensor, directly over the image sensor, or the like, a multilayer film or the like can be configured such that transmission wavelength shifts to a short wavelength side as it goes further to the left of the imaging surface.

Here, assume that shooting is performed at three optical arrangements, $C_{-1}$, $C_0$, and $C_{+1}$. The transmission wavelength band at the left and right of the imaging surface in the respective arrangements are indicated as B0 to B2 in the images 404 to 406. While B0 is the transmission characteristic of a perpendicular incidence, B2 is a transmission characteristic that has shifted farthest toward a short wavelength.

When looking at the transmission characteristics at each position in the imaging surface indicated in the images 404 to 406, it is evident that, at any of the positions in the imaging surface, an image that has been shot in a transmission wavelength band of B0 and B1 has been acquired. The regions of the images 404 to 406 which correspond to the transmission wavelength band here are rearranged from a state 1 to a state 2 (a state in which the same bands have been grouped while maintaining their position in the images) illustrated in FIG. 5. Accordingly, in each region in the imaging surface, an image that has been shot at a transmission wavelength band, B0, and an image that has been shot at a transmission wavelength band, B 1, for example, are acquired. In other words, images in which pixel values have been rearranged have a signal value in relation to a spatial position and wavelength as in a schematic diagram of spectral images illustrated on the bottom right of FIG. 5.

(Example in which Acquisition of Spectral Image has been Further Generalized)

In the above description, a change in a transmission characteristic due to an angle of incidence has been represented in three bands, B0 to B2. More precisely, in a case where, for example, the optical position is $C_{-1}$, an angle of incidence of a beam on the image sensor 403 increases as it goes further to the left of the imaging surface. Accordingly, even within the respective ranges that correspond to the bands represented in the above-described three values, B0 to B2, a transmission characteristic is different in the left and right of the image sensor. As described in the following embodiment, the widths of the regions that correspond to the respective transmission bands decrease as the amount that the optical axis of the imaging optical system and the center position of the image sensor are shifted for each instance of shooting decreases; accordingly, it becomes possible to ignore the difference between the transmission characteristics of the left and right within a range that corresponds to a certain band.

Figure 6:
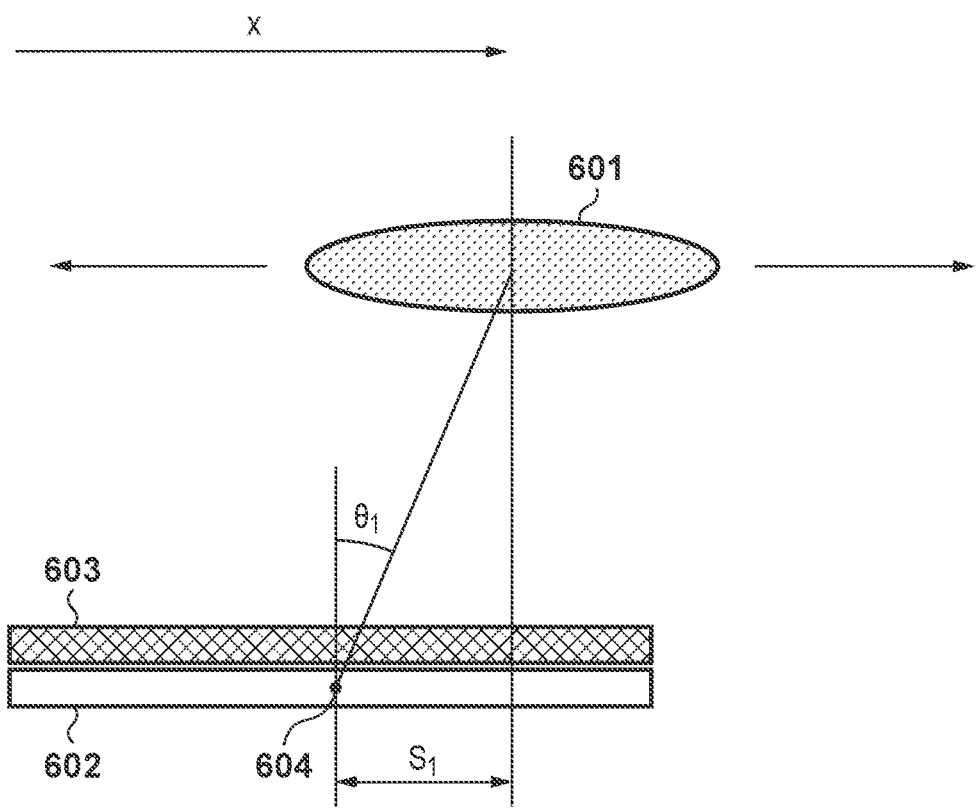
FIG. 6 is a view (1) describing a generalized example of acquiring a spectral image according to the first embodiment.

An example of a case where acquisition of a spectral image is more accurately (with further generalization) represented will be described with reference to FIG. 6 and FIG. 7. In FIG. 6, a reference numeral 601 indicates an imaging optical system and a reference numeral 602 indicates an image sensor, and they respectively correspond to the imaging optical system and the image sensor included in the image capturing unit 101. An optical element 603 such as a multilayer film or photonic crystal having an incidence angle dependence is arranged in or directly over an image sensor 602. The imaging optical system 601 is configured to be able to move on a plane parallel to a plane (i.e., a light-receiving surface) on which the pixels of the image sensor have been arranged. Assuming that a state in which the optical axis and a center 604 of the image sensor coincide is an origin of movement of the imaging optical system, FIG. 6 represents a state in which the position of the optical axis of the imaging optical system 601 is shifted by $S_1$ in a positive direction on the x-axis. In this state, a beam from the imaging optical system 601 will be incident at an angle $\theta_1$ on the center pixel of the image sensor 602.

Figure 7:
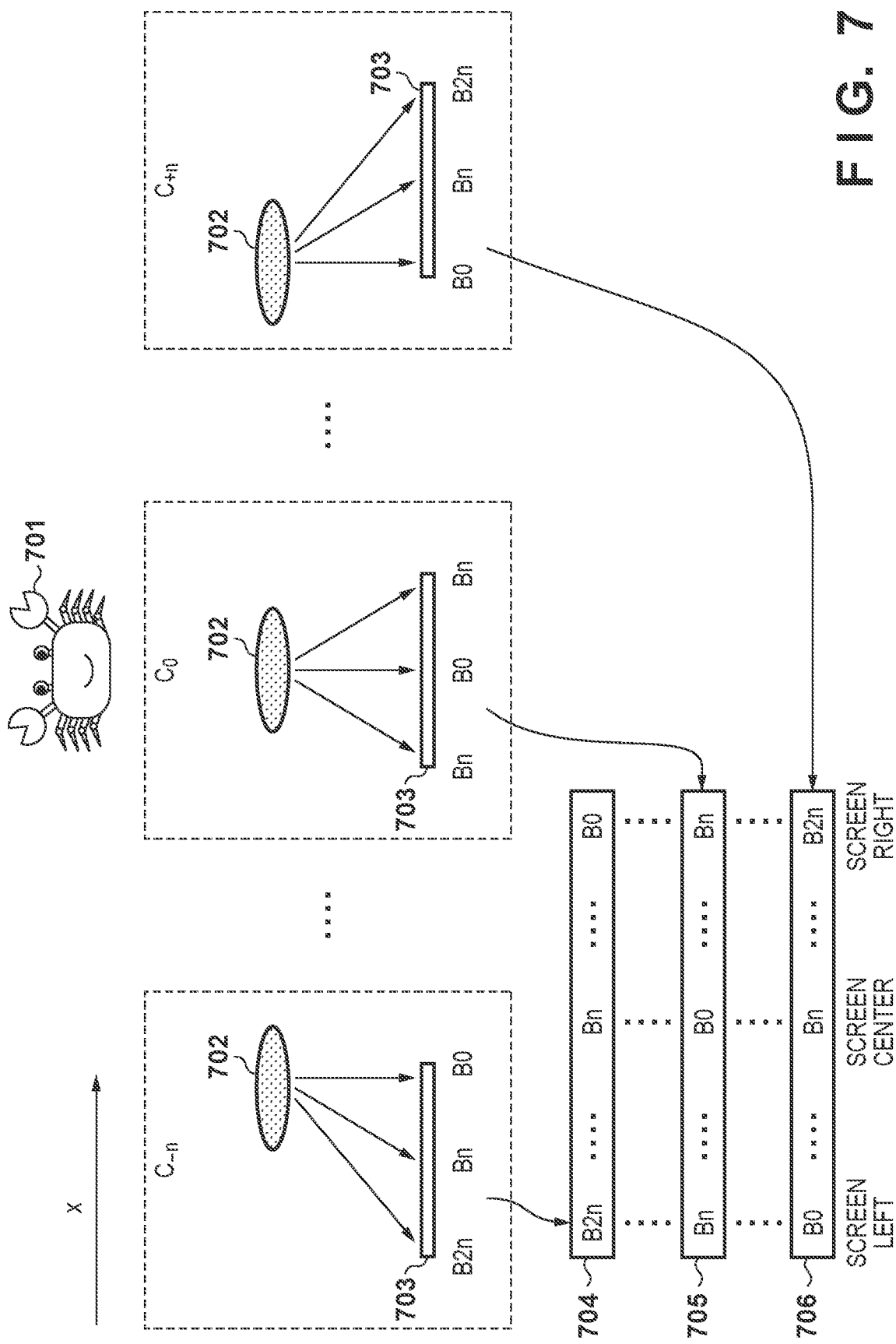
FIG. 7 is a view (2) describing a generalized example of acquiring a spectral image according to the first embodiment.

In FIG. 7, a reference numeral 702 indicates an imaging optical system and a reference numeral 703 indicates an image sensor, and they respectively correspond to the imaging optical system and the image sensor included in the image capturing unit 101. In an example illustrated in FIG. 7, the optical element 603 illustrated in FIG. 6 is collectively illustrated as an image sensor 703 together with the image sensor. Assume that optical arrangements of the imaging optical system 702 and the image sensor 703 with respect to a subject 701 are $C_{-n}, \ldots, C_0, \ldots,$ and $C_{+n}$, respectively. $C_{-n}$ to $C_0$ to $C_{+n}$ are in a relation in which the optical axis of the imaging optical system 702 and the center position of the image sensor 703 have shifted to the left or right of the imaging surface, and there are a total of 2n+1 arrangements.

When the image sensor 703 acquires an image, the positional relationship of the imaging optical system 702 and the image sensor 703 is shifted so as not to change the position of the subject 701. At this time, configuration may be taken so as to, after having shifted the positional relationship of the two, temporarily stop the shifting and then shoot, and then start a shift of the positional relationship once again. Also, configuration may be taken so as to perform shooting while continuously shifting the positional relationship of the two. The smaller the displacement of the position within an angle of view a subject is, even in a case where the imaging optical system and the image sensor of the same condition are used, it is possible to acquire a spectral image of a wider angle.

The 2n+1 images shot at arrangements, $C_{-n}$ to $C_0$ to $C_{-n}$, whose transmission characteristic bands in the left and right of the imaging surface are assumed to be B0 to B2n are illustrated as images 704 to 706. As described above, while B0 is a band in which transmission is performed at an arrangement of a perpendicular incidence, a transmission characteristic band shifts toward a short wavelength side the closer the band is to B2n.

Figure 8:
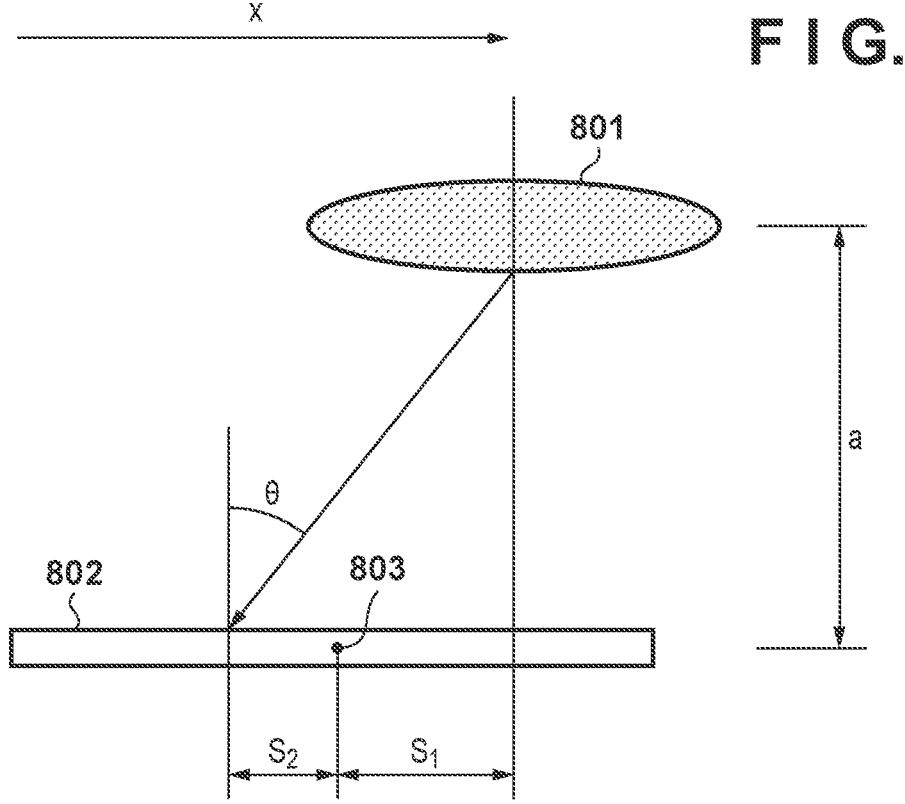
FIG. 8 is a view describing a relation between a shift amount of an imaging optical system and an angle of incidence of a beam according to the first embodiment.

Furthermore, a relation between a shift amount of an imaging optical system and an angle of incidence of a beam will be described with reference to FIG. 8. Note that an image sensor 802 and an imaging optical system 801 illustrated in FIG. 8 respectively correspond to the image sensor and the imaging optical system of the image capturing unit 101. A case where in a system in which the imaging optical system 801 shifts to an x direction of the image sensor 802 a pupil distance of the imaging optical system 801 is a and the shift amount of the imaging optical system from the center of the image sensor 802 is S1 is considered. At this time, a relation of an incidence angle of a beam with respect to a certain column (of pixels) that is apart by S2 from a center 803 of the image sensor 802 is expressed by Equation (1).

$$\tan\theta = \frac{S_1 + S_2}{a} \tag{1}$$

In other words, an incidence angle $\theta$ is:

$$\theta = \tan^{-1}\frac{S_1 + S_2}{a} \tag{2}$$

Figure 9:
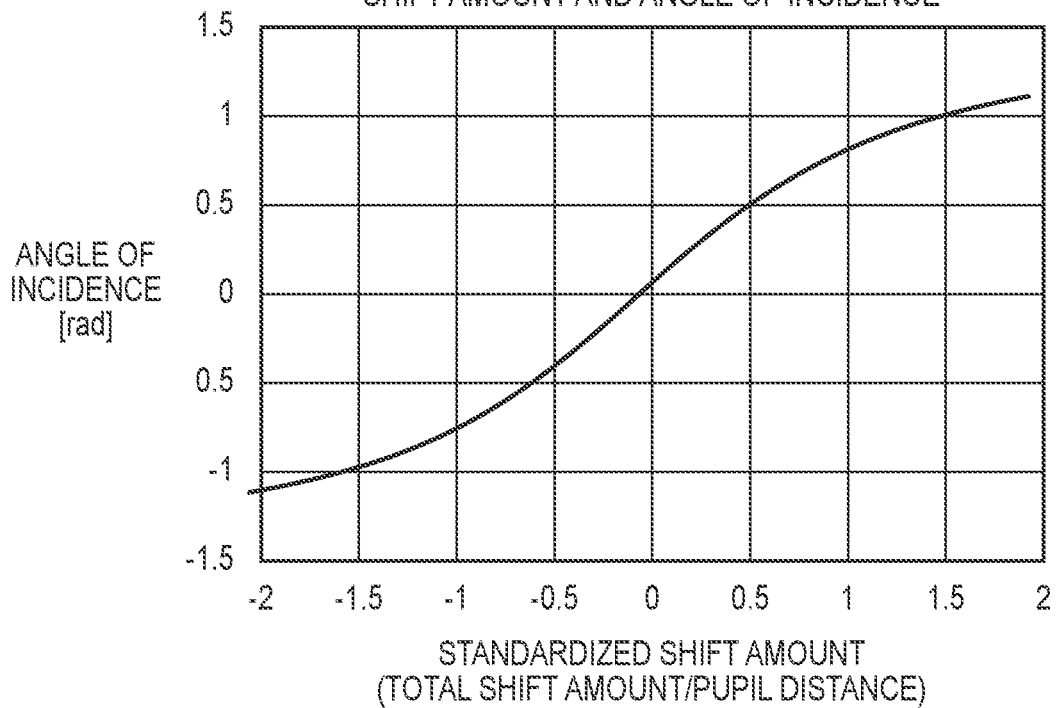
FIG. 9 is a view describing a relation between a shift amount and an angle of incidence according to the first embodiment.

This relation is illustrated in the graph of FIG. 9. However, a standardized shift amount S illustrated in the horizontal axis is a value expressed by Equation (3).

$$S = \frac{S_1 + S_2}{a} \tag{3}$$

According to the graph illustrated in FIG. 9, it is understood that once the shift amount of the imaging optical system is decided, the angle of incidence on a pixel at each position is uniquely decided. Note that in a range in which the standardized shift amount is $-0.5<S<0.5$, it is possible to consider that the relation between the angle of incidence and the standardized shift amount is almost linear.

It is possible to express the relation between the angle of incidence of a principal ray and the transmission characteristics of the optical element using Equation (4) with λ as a central wavelength of a transmission spectrum. In other words, the shape of a function f is decided by a structure of a multilayer film or photonic crystal.

$$\lambda = f(\theta) \tag{4}$$

In other words, it is understood that a beam of an angle $\theta$ in accordance with Equation (2) and of a central wavelength, wavelength λ, in accordance with Equation (4) is incident on a column (of pixels) at a position apart by $S_2$ from the center of the image sensor 802 in an image that was shot with the imaging optical system 801 and the image sensor 802 being shifted by S1.

Figure 10:
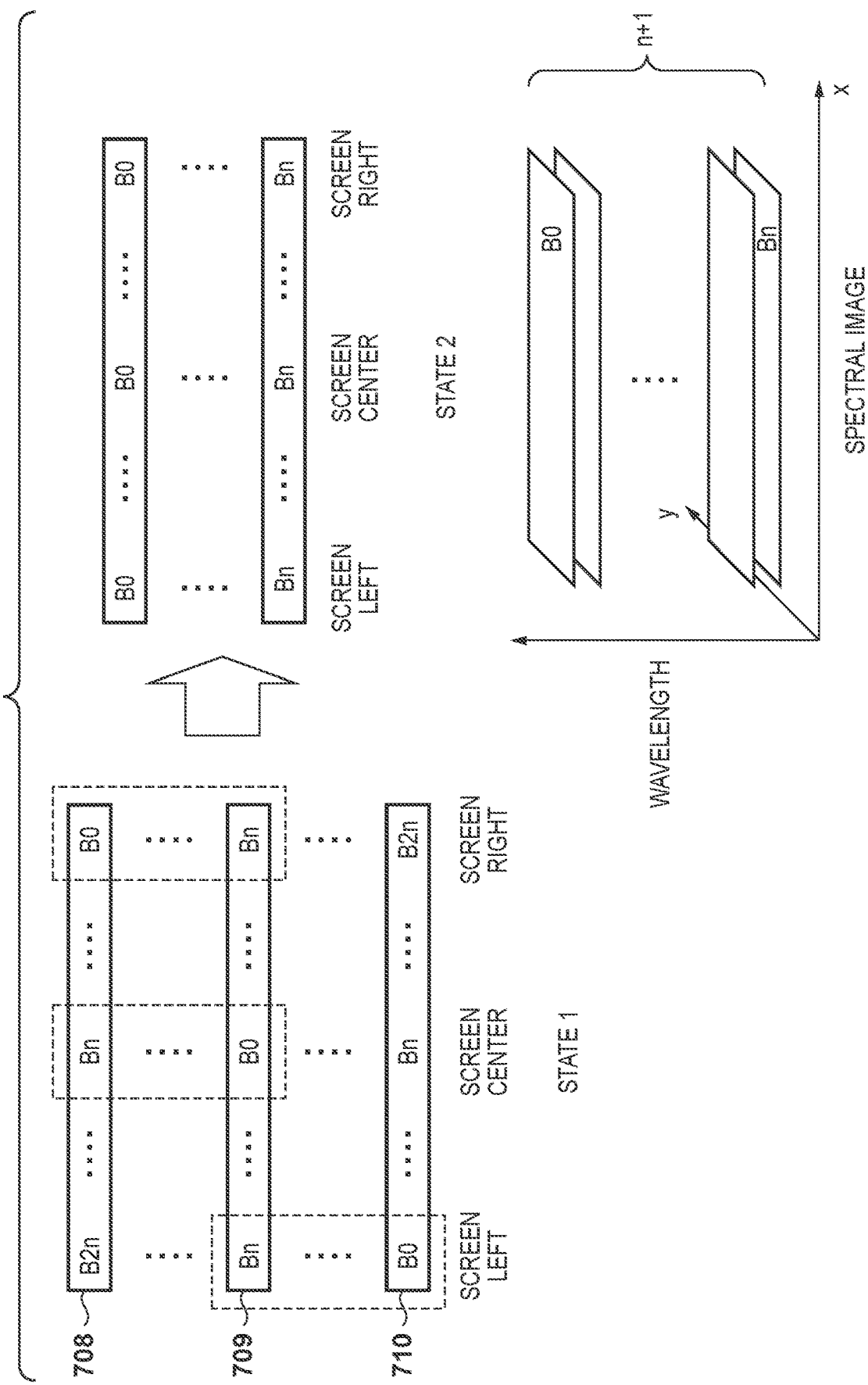
FIG. 10 is a view describing acquisition of a spectral image according to a first embodiment.

In the 2n+1 images illustrated by the images 704 to 706, at any of the positions in the imaging surface, an image that has been shot in a central transmission wavelength band of B0 to Bn has been obtained. By rearranging these images from a state 1 to a state 2 illustrated in FIG. 10, in each region in the imaging surface, images that have been shot at a band of n+1 in which a central transmission wavelength is from B0 to Bn are acquired as illustrated in the spectral images at the bottom right of FIG. 10.

The wavelength range of spectral images are decided by the magnitude of the angular dependency of the optical element having an angular dependency, in other words, the shape off of Equation (4) (i.e., the characteristic of angular dependency of the optical element), and a shift amount of relative positions of the imaging optical system and the image sensor. Limiting the shift amount (i.e., decreasing the movement amount of the imaging optical system) makes it possible to decrease acquired wavelength range. The wavelength resolution of the spectral images is decided by the number of shots per amount of change in the angle due to shifting (i.e., the number of shots per shift amount of the imaging optical system and the image sensor). If shooting intervals in the image capturing apparatus 100 are constant, the wavelength resolution will increase as a temporal change in the shift amount (i.e., a movement speed of the imaging optical system) decreases.

In a case where a function f of Equation (4) is approximately linear and the standardized shift amount S is −0.5<S<0.5, the relation between the column of pixels of the image sensor (a position on the light-receiving surface) and the transmission central wavelength will approximately be linear. In such a case, it is possible to cause the width (the number of columns) on the image sensor that corresponds to B0 to B2n to be equal; accordingly, the structure of the image sensor and the processing related to image data becomes simpler.

Also, when the relation between the standardized shift amount S and the incidence angle θ of FIG. 9 is expressed as 0=g(S), it can be combined with function f of Equation (4) and then expressed as in Equation (5).

$$\lambda = f(\theta) = f(g(S)) = h(S) \quad (5)$$

The function g is decided by pupil distance, and the function f is decided by the structure of the optical element. If it is possible to, by appropriately defining these, cause the combined function h to approximately be linear, the structure of the image sensor and the processing related to image data will similarly be simplified.

Figure 11:
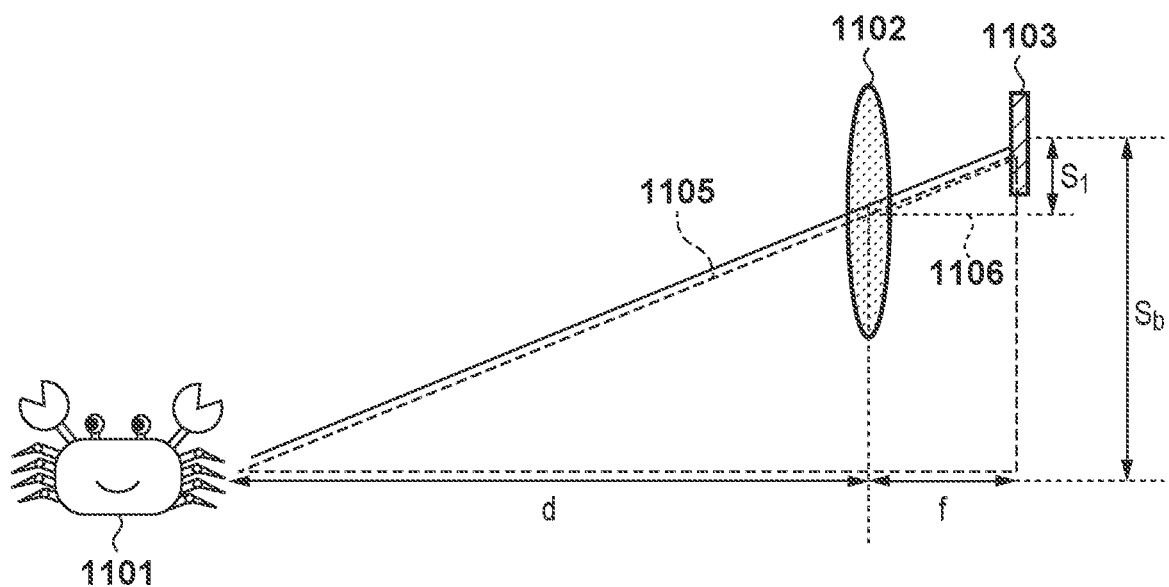
FIG. 11 is a view describing a relation between a position of the image capturing apparatus and a shift amount according to a first embodiment.

Note that in the present embodiment, configuration may be taken such that the image capturing apparatus 100 is moved and the imaging optical system is shifted in accordance with the movement amount thereof. This makes it possible to change the angle of incidence of a beam on the image sensor without changing the angle of view (composition). The relation between the position of the image capturing apparatus 100 and the shift amount will be described using FIG. 11. Note that the imaging optical system and the image sensor described here correspond to those included in the image capturing unit 101. Assume that a state in which the shift amount between the optical axis of an imaging optical system 1102 and the center of an image sensor 1103 is 0 and a subject is formed in the desired angle of view on the image sensor 1103 is the origin of the image capturing apparatus 100. The movement amount from the origin of the image sensor 1103 is Sb, which is the same as the image sensor 1103, since the image sensor 1103 and the image capturing apparatus 100 are fixed. Assuming that the shift amount of the imaging optical system is S1, in order to not change the angle of view on the image sensor of a subject 1101, since the relation between the subject, the imaging optical system, and the image sensor, as a triangle 1105 and a triangle 1106 are similar, $$(d+f):S_b = f:S_1 \quad (6)$$

$$S_1 = \frac{f \cdot S_b}{d+f} \quad (7)$$

will be set.

Here, d is a subject distance (from the imaging optical system) and f is a pupil distance from the imaging optical system 1102. In other words, in a case where the image capturing apparatus 100 is at a position that is away by Sb from the origin, the imaging optical system 1102 is controlled so as to shift by $S_1$.

In a case where shooting is performed in this condition, even though the system of the image capturing apparatus 100 is the same, it is possible to acquire a spectral image at the widest angle of view. Also, similarly to the description of FIG. 10, if the movement amount of the image capturing apparatus 100 is made smaller, it is possible to decrease the wavelength range to be acquired. Also, if shooting intervals in the image capturing apparatus 100 are constant, the wavelength resolution will increase as a temporal change in the shift amount (i.e., a movement speed of the image capturing apparatus 100) decreases.

Note that in a case where the movement of the image capturing apparatus 100 is irregular or the shift amount of the imaging optical system 1102 with respect to the position of the image capturing apparatus 100 is not appropriate, the angle of view will become smaller in accordance with the amount of misalignment; however, an accurate spectral image will be acquired within that angle of view.

In the above description, an example of a case where the image sensor is fixed to the housing of the image capturing apparatus 100 and the imaging optical system can be shifted was described. However the above-described spectral image acquisition can be similarly performed even in a case where the imaging optical system is fixed to the housing of the image capturing apparatus and the image sensor is shifted. Also, in the above description, description was given in accordance with an example limited to a one-dimensional angle of incidence; however, configuration may be taken so as to expand the angle of incidence to a two-dimensional direction or use an imaging optical system having an angular dependency only in a one-dimensional direction.

The image capturing apparatus 100 and the imaging optical system in the image capturing unit 101 is of a limited size; accordingly, there is limitation to the lens shift amount. Also, a spectral element arranged on the image sensor in the image capturing unit 101 is also limited in the angle of incidence at which a desired function can be realized. In the present embodiment, the shift amount is decided based on the distance to the subject and the position of the image capturing apparatus 100; however, in a case where the camera is moved greater than or equal to the shift amount limit, the relation between the three (the subject distance, the camera position, and the shift amount) will be broken. In such a case, an image that does not contribute to the realization of the desired function of acquiring a spectral image will be acquired. Accordingly, when a limit for a physical shift or a limit for an angle of incidence at which the optical element can realize a desired function has been reached while moving the image capturing apparatus 100, a notification may be performed to the user by notification means such as sound, light, or vibration. The notification to the user may indicate, for example, that even if the camera is moved greater than or equal to this, it does not contribute to acquisition of a spectral image.

(Series of Operations Pertaining to Image Capturing Processing for Acquiring Spectral Image)

Figure 12:
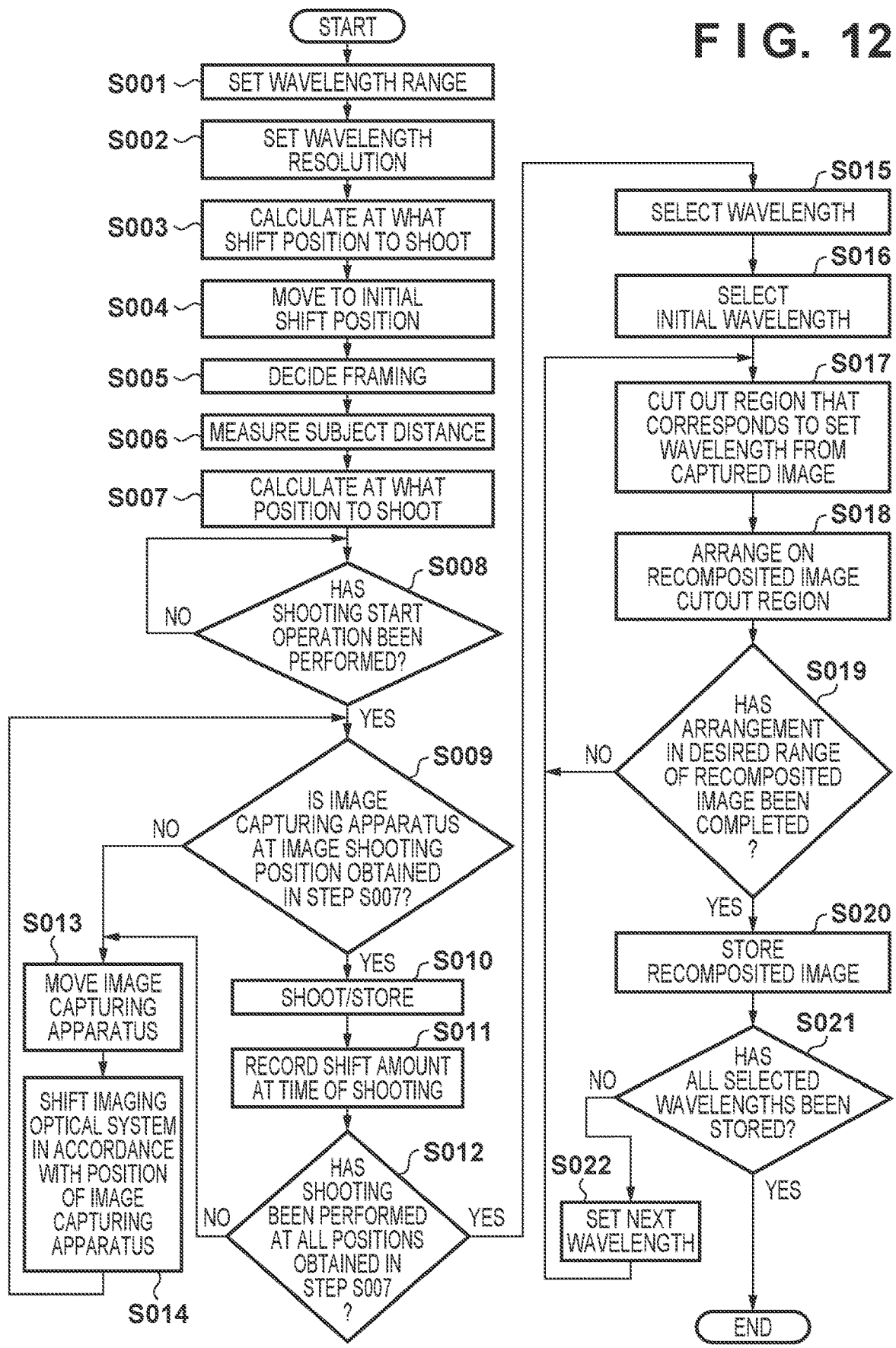
FIG. 12 is a flowchart illustrating a series of operations pertaining to image capturing processing for acquiring a spectral image.

A series of operations pertaining to image capturing processing for acquiring a spectral image in the present embodiment will be described with reference to FIG. 12. Note that this image capturing processing is realized by the control unit 102 of the image capturing apparatus 100 controlling each unit of the image capturing apparatus 100 by deploying and executing a program stored in the storage unit 105, unless otherwise specified. Also, in the following processing, an example of a case where a configuration in which the imaging optical system of the image capturing unit 101 is movable and the position thereof can be shifted with respect to a fixed image sensor will be described.

In step S001, the control unit 102 accepts a setting related to a wavelength range at which to acquire a spectral image by the user and then sets a value of a wavelength range at which to acquire a spectral image.

In step S002, the control unit 102 accepts a setting related to wavelength resolution by the user and then sets a value of the wavelength resolution. Also, the control unit 102 can decide the number of shots per angle in accordance with the value of the wavelength resolution.

In step S003, the control unit 102 calculates at what shift position to shoot based on the number of shots per angle obtained in step S002 and the relation between the angle and shift amount (Equation 2).

In step S004, the image capturing unit 101 moves the imaging optical system of the image capturing unit 101 to an initial shift position in accordance with an instruction by the control unit 102. The initial shift position of the imaging optical system is obtained by the control unit 102 using the wavelength range set in step S001.

In step S005, the image sensor of the image capturing unit 101 receives a beam from a subject via the imaging optical system moved in step S004. By this, framing is decided.

In step S006, the control unit 102 measures a distance of the subject. The control unit 102 acquires the subject distance by measuring the distance of the subject using, for example, a distance measurement sensor (not shown).

In step S007, the control unit 102 calculates at what position to shoot based on the shift position obtained in step S003 and the subject distance acquired in step S006 in accordance with, for example, Equation (7). Regarding the position of the image capturing apparatus 100 calculated here, a plurality of these will be calculated in accordance with a shift position. Note that in order to move to the image shooting position that the image capturing apparatus 100 obtained, the control unit 102 may display on the display 104 a display that indicates the movement direction and the necessary movement amount and cause the user to move the image capturing apparatus 100. At this time, the control unit 102, based on a difference between the image shooting position obtained based on sensor information of a gyro sensor, GPS, or the like (not shown) and the current position, may indicate how much movement is required in what direction. Alternatively, the control unit 102 may move to the obtained image shooting position using a mechanical driving apparatus attached to the image capturing apparatus 100. In such a case the control unit 102 may output control information that indicates the image shooting position via, for example, the I/F 107 to an external driving apparatus.

In step S008, the control unit 102 determines whether a shooting start operation (e.g., a press of a shutter-release button) has been performed to the operation unit 106 by the user. The control unit 102, in a case where it is determined that a shooting start operation has been performed based on a signal from the operation unit 106, starts shooting and advances the processing to step S009 and otherwise, returns the processing to step S008.

In step S009, the control unit 102 determines whether or not the image capturing apparatus 100 is at the position obtained in step S007. The control unit 102, in a case where it is determined that the image capturing apparatus 100 is at the obtained position based on sensor information of, for example, a gyro sensor, GPS, or the like (not shown), advances the processing to step S010 and otherwise, advances the processing to step S013.

In step S010, the control unit 102 executes shooting and stores in the storage unit 105 the captured image acquired by the shooting. In step S011, the control unit 102 records (store in the storage unit 105) the shift amount at the time of the immediately preceding shooting. Note that the processing in step S010 and the processing in step S011 may be performed at the same time or either one may come first.

In step S012, the control unit 102 determines whether shooting has been completed at all the positions obtained in step S007. The control unit 102, in a case where it is determined that shooting has not been completed at all the positions obtained in step S007, advances the processing to step S013 and otherwise, advances the processing to step S015.

In step S013, the position of the image capturing apparatus 100 is moved, and in step S014, the image capturing unit 101, by an instruction of the control unit 102, shifts the imaging optical system in accordance with the position of the image capturing apparatus 100. As described above, operation of steps S010 to S014 for performing shooting when the image capturing apparatus 100 reaches the position at which the next shooting will be performed obtained in step S007 will be repeated until the determination of step S012 is satisfied.

In step S015, the control unit 102 selects at what wavelength to acquire an image. The control unit 102 may designate a specific wavelength or wavelength range in accordance with an operation to the operation unit 106 by the user or may automatically select it in accordance with a predefined reference. Also, the control unit 102 may set a target wavelength to be all the acquired wavelengths.

In step S016, the control unit 102 selects a wavelength to be processed first among the wavelengths selected in step S015. The control unit 102 selects as the wavelength to be processed first the wavelength that corresponds to a predefined condition such as the maximum, the minimum, or the median value of the selected wavelengths.

In step S017, the control unit 102 cuts out a region that corresponds to the set wavelength from each captured image. This corresponds to acquisition of pixel values that are in any wavelength among, for example, B0 to Bn from a captured image as in state 1 of the above-described FIG. 10.

In step S018, the control unit 102 arranges on a recomposited image the cutout image regions. This corresponds to acquisition of image data of a specific wavelength that constitutes the image data arranged as in state 2 of the above-described FIG. 10.

In step S019, the control unit 102 determines whether arrangement in a desired range of the recomposited image has been completed and in a case where it is determined that the arrangement has been completed, advances the processing to step S020 and otherwise, returns the processing to step S017.

In step S020, the control unit 102 stores in the storage unit 105 the generated recomposited image. Then, in step S021, the control unit 102 determines whether image data (recomposited image) has been stored for all wavelengths selected in step S015. The control unit 102, in a case where it is determined that image data has not been stored for all wavelengths, advances the processing to step S022 and otherwise, ends the present processing. In step S022, the control unit 102 sets the next wavelength and then repeats the processing in steps S017 to S020 until all selected wavelengths are stored. Note that here, description was given using an example of processing in which a recomposited image is generated after shooting at all the positions has been completed; however, configuration may be taken so as to gradually generate, every time shooting is performed at one position, a recomposited image using the images acquired by the shooting.

Figure 13:
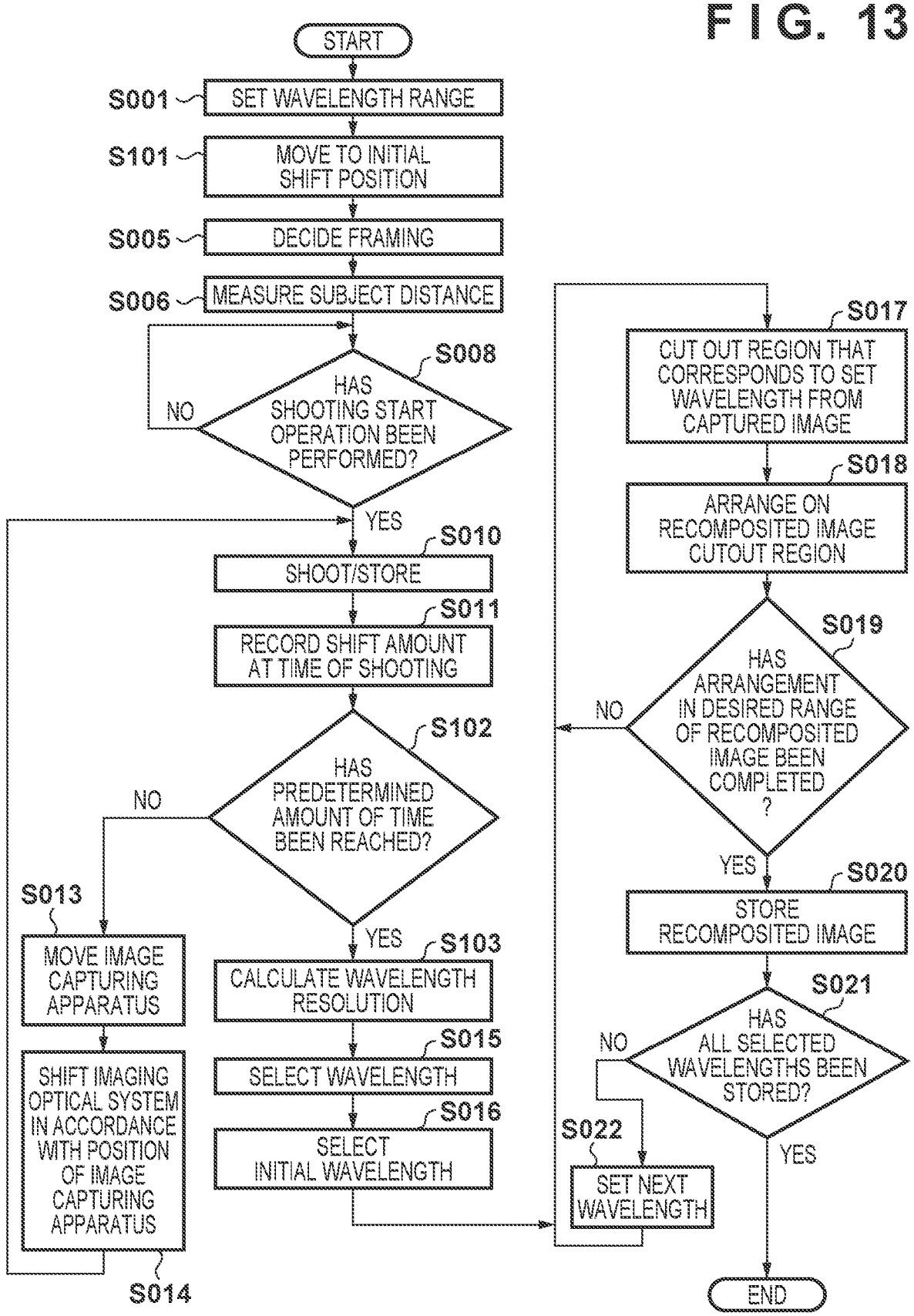
FIG. 13 is a flowchart illustrating other operations pertaining to image capturing processing for acquiring a spectral image.

Note that in a case where as described above, shooting intervals are constant and wavelength resolution is adjusted in accordance with the speed at which the position of the image capturing apparatus 100 is moved, the control unit 102 does not need to set the wavelength resolution in step S002. The operation in such a case is illustrated in FIG. 13. Note that this image capturing processing is realized by the control unit 102 of the image capturing apparatus 100 controlling each unit of the image capturing apparatus 100 by deploying and executing a program stored in the storage unit 105, unless otherwise specified. Note that the processing that is the same or substantially the same as FIG. 12 will be assigned the same reference numeral, and redundant description will be omitted.

In step S001, the control unit 102 accepts a setting related to a wavelength range at which to acquire a spectral image by the user and then sets a value of a wavelength range at which to acquire a spectral image.

In step S101, the control unit 102 moves the imaging optical system to the initial shift position in accordance with the wavelength range set in step S101. Then, the above-described steps S005 to S006 of FIG. 12 are executed. In step S008, the control unit 102 determines whether a shooting start operation (e.g., a press of a shutter-release button) has been performed to the operation unit 106 by the user. The control unit 102, in a case where it is determined that a shooting start operation has been performed based on a signal from the operation unit 106, starts shooting and advances the processing to step S010 and otherwise, returns the processing to step S008. The control unit 102, in a case where it is determined that a shooting start operation has been performed, by executing steps S010 and S011, executes shooting and storing of shift amount.

In step S102, the control unit 102 determines whether a predetermined amount of time has been reached since the start of shooting and in a case where it is determined that a predetermined amount of time has not been reached, by executing steps S013 and S014, repeats shooting and shifting of the imaging optical system. Meanwhile, the control unit 102, in a case where it is determined that a predetermined amount of time has elapsed, advances the processing to step S103.

In step S103, the control unit 102 calculates wavelength resolution from the number of shots per shift amount (i.e., the number of shots per angle) of the captured image. Then, the control unit 102 executes the processing of the above-described steps S015 to S021.

As described above, in the present embodiment, an image having a pixel value for each transmission wavelength band and spatial coordinate is acquired by capturing a beam transmitted through an optical element having an incidence angle dependence while changing the relative position of the imaging optical system and the image sensor in accordance with the position of the image capturing apparatus 100. This makes it possible to realize an image capturing apparatus for a spectral image that is small, simple, and is capable of freely adjusting a wavelength range and resolution by way of moving the camera. In other words, it is possible to reduce limitation on wavelength resolution (the number of bands) and obtain spectral information using a simple configuration.

Second Embodiment

A second embodiment will be described below. In the above-described first embodiment, as illustrated in FIG. 7, the angle of incidence of a beam onto the pixels of the image sensor is changed without changing the angle of view by shifting the imaging optical system or the image sensor with respect to the subject. In contrast to this, in the present embodiment, the same spectral image as the first embodiment is acquired by changing a crop position of the image sensor in accordance with a position using an image capturing apparatus that can perform an imaging surface crop to a portion of the image sensor and output the result. Note that in the present embodiment, a part of the processing pertaining to acquisition of a spectral image is different from the first embodiment; however, the configuration of the image capturing apparatus 100 may be the same. Note that the configurations that are the same or substantially the same as the first embodiment will be assigned the same reference numeral, the description thereof will be omitted, and points of difference will be mainly described.

Acquisition of a spectral image according to the present embodiment will be described with reference to FIG. 14. A reference numeral 1402 is an imaging optical system and a reference numeral 1403 is an image sensor, and they correspond to the imaging optical system and the image sensor of the image capturing unit 101. The relative position of the imaging optical system and the image sensor of the present embodiment does not change depending on the position of the image capturing apparatus 100. An optical element such as a multilayer film or photonic crystal having an incidence angle dependence is arranged in or directly over the image sensor. An arrangement in which a crop region of the image sensor with respect to a subject 1401 is a reference numeral 1405 is $C_{-n}$, an arrangement in which a crop region of the image sensor with respect to the subject 1401 is a reference numeral 1406 is $C_0$, and an arrangement in which a crop region of the image sensor with respect to the subject 1401 is a reference numeral 1407 is $C_{+n}$. $C_{-n}$ to $C_0$ to $C_{+n}$ are in a relation in which the optical axis of the imaging optical system and the crop position of the image sensor have shifted to the left or right from the center of the image sensor, and there are a total of 2n+1 arrangements.

The 2n+1 images shot at each arrangement of $C_{-n}$ to $C_0$ to $C_{+n}$ whose transmission characteristic bands in the left and right of the imaging surface are assumed to be B0 to B2n are illustrated as reference numerals 1408 to 1410. As described above, while B0 is a band at an arrangement of a perpendicular incidence, a transmission characteristic band shifts toward a short wavelength side the closer the band is to B2n.

Figure 14:
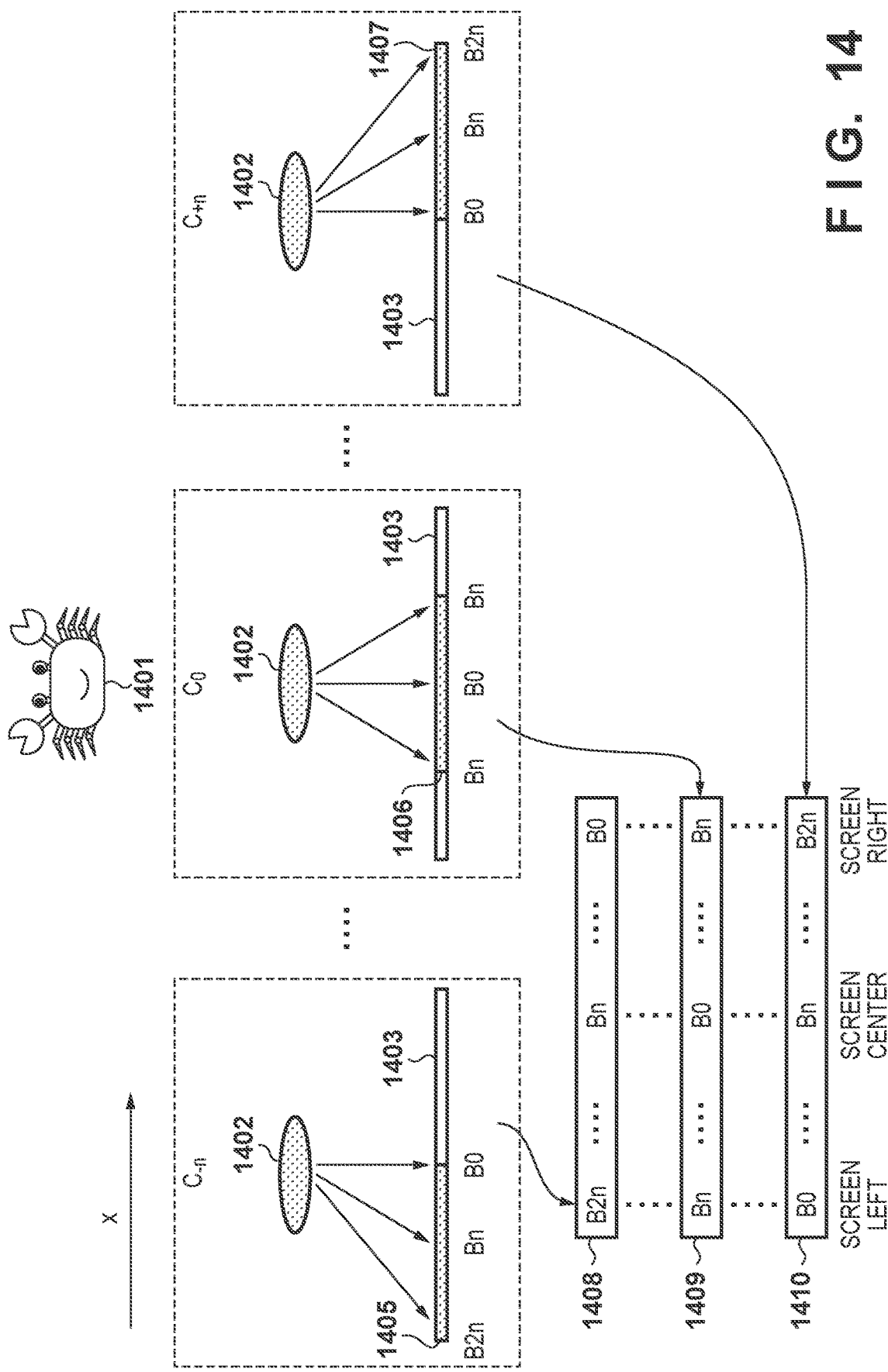
FIG. 14 is a view (1) describing acquisition of a spectral image according to a second embodiment.
Figure 15:
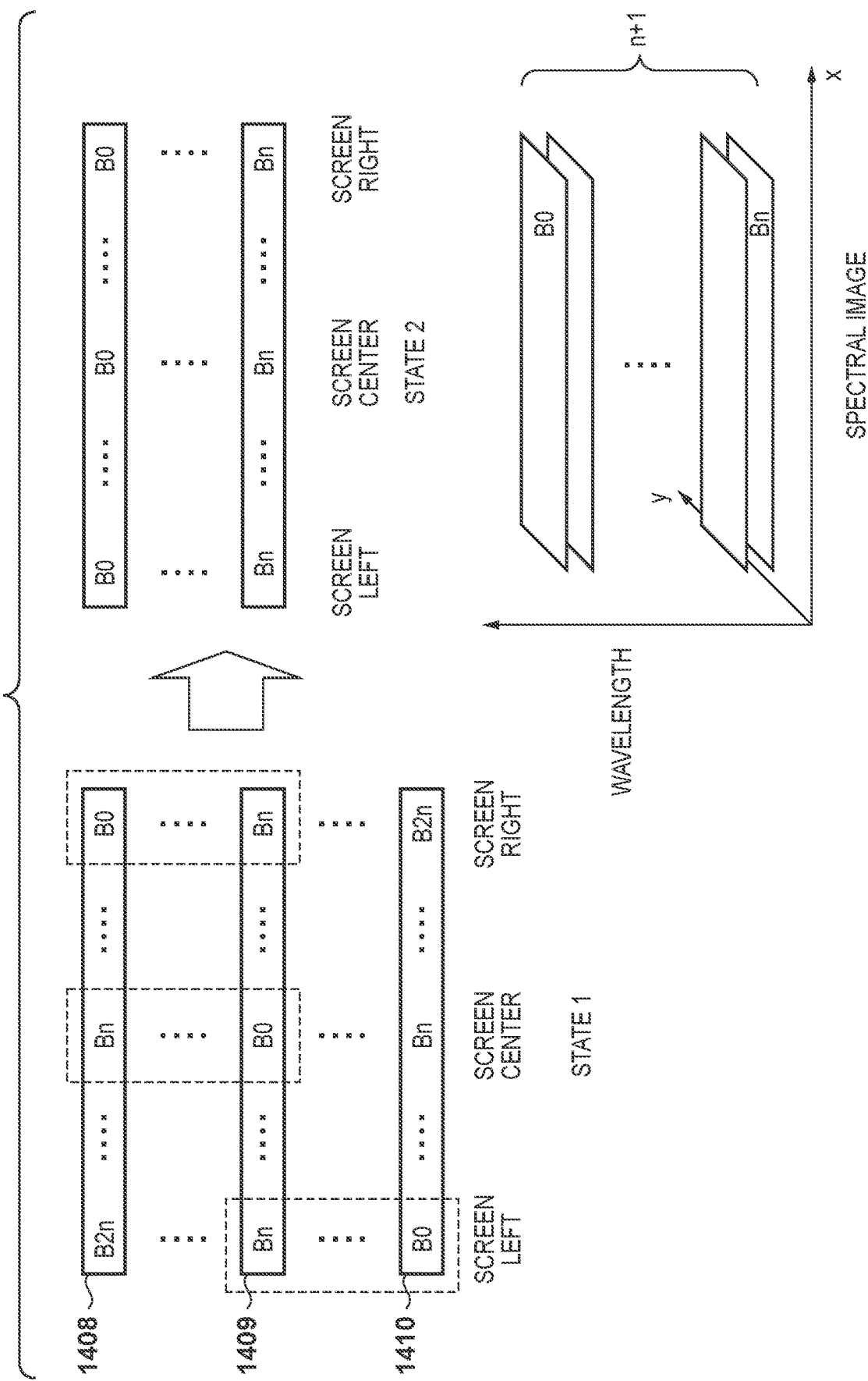
FIG. 15 is a view (2) describing acquisition of a spectral image according to the second embodiment.

By rearranging the image signals illustrated in FIG. 14 from a state 1 to a state 2 of FIG. 15, in each region in the imaging surface, images that have been shot at a band of n+1 in which a central transmission wavelength is from B0 to Bn are acquired as in the example of the spectral images illustrated in FIG. 15.

Figure 16:
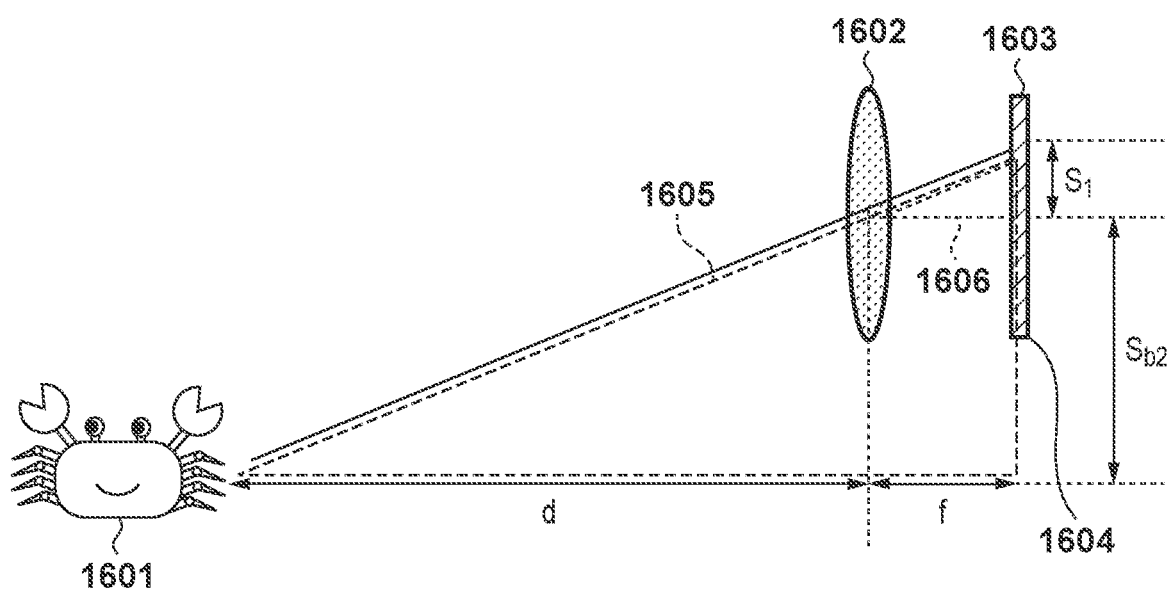
FIG. 16 is a view describing a position of the image capturing apparatus and a crop position according to the second embodiment.

In the present embodiment, at the time of acquiring an image while moving the image capturing apparatus, a crop position of the image sensor is shifted so as not to change the position of a subject 1601. Assuming that the position of the image capturing apparatus is $S_{b2}$ and a shift amount of the optical axis and the center of a crop region is S1, a relation between the subject 1601, an imaging optical system 1602, and the center of the crop region will be as in Equations (8) and (9) based on the similarity of a triangle 1605 and a triangle 1606 as illustrated in FIG. 16.

$$d:S_{b2}=f:S_1 \tag{8}$$

$$S_1 = \frac{f \cdot S_{b2}}{d} \tag{9}$$

Here, d is a subject distance (from the imaging optical system) and f is a pupil distance from the imaging optical system. In other words, in a case where the image capturing apparatus 100 is at a position that is away by $S_{b2}$ from the origin, the center of the crop region is controlled so as to shift by $S_1$.

Note that image data readout from the image sensor may be performed after deciding a shift position from the center of the crop region using the relation of Equation (9) or an image may be stored by performing a readout of the full angle of view of the image sensor and then cropping may be performed in the post-processing using a condition that satisfies the relation of Equation (9). A crop region may be decided from a range in which each image overlaps in a case where the images shot at each position of the image capturing apparatus 100 are read out at full angle of view and are set so that the subject overlaps.

In the present embodiment, configuration was taken such that a beam that is transmitted through an optical element having an incidence angle dependence is captured while changing the position of an image capturing apparatus, a crop position related to an output of an image sensor is changed in accordance with the position, and an image having a pixel value for each transmission wavelength band and spatial coordinate is acquired. This makes it possible to realize an image capturing apparatus for a spectral image that is small, simple, and is capable of freely adjusting a wavelength range and resolution by way of moving the camera without using a movable portion related to the imaging optical system or the image sensor.

Third Embodiment

In the first embodiment and the second embodiment, an example of a case where an optical element that has a bandpass characteristic and angular dependency such as a dielectric multilayer film and photonic crystal is used as an optical element to be arranged on the image sensor was described. Meanwhile, the same function can be achieved by using a combination of an optical element that has a spectral characteristic such as a diffraction grating and a prism and a light-shielding film that limits transmission wavelength as an optical element. Accordingly, in the present embodiment, an example of a case where an optical element that has a spectral characteristic such as a diffraction grating and a prism and a light-shielding film that limits transmission wavelength are combined as an optical element will be described. Note that in the present embodiment, the internal configuration of the image capturing unit 101 is different from the first embodiment; however, the configuration of the image capturing apparatus 100 illustrated in FIG. 1 may be the same.

Description will be given by comparing a case where an optical element (described in the first and second embodiments) having a bandpass characteristic is used and a case where an optical element that has a spectral characteristic (according to the present embodiment) is used with reference to FIGS. 17A to 17D.

Figure 17A:
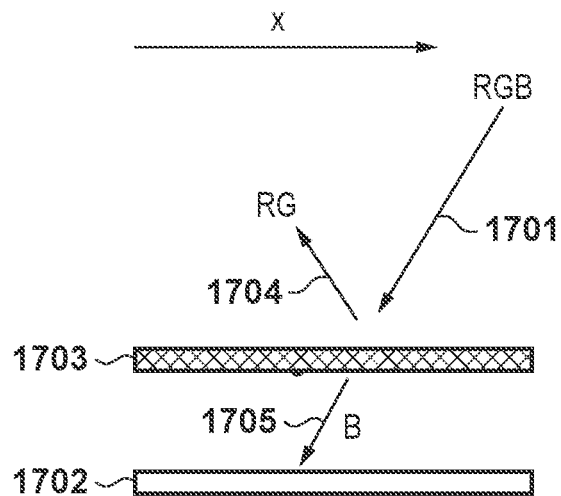
FIG. 17A to 17D are views describing examples of characteristics of optical elements according to a third embodiment.
Figure 17B:
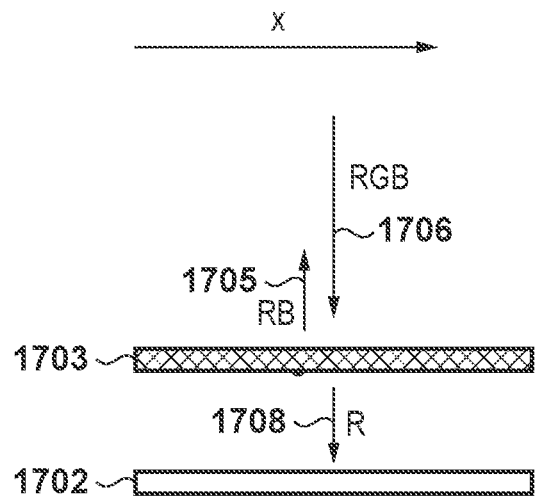

FIG. 17A and FIG. 17B illustrate examples in which an optical element having a bandpass characteristic according to the above-described embodiment is used. FIG. 17A illustrates a relation between incident light 1701, an optical element 1703, and an image sensor 1702 in a case where a beam is incident, for example, 30° on an element having a bandpass characteristic. FIG. 17B illustrates a case where incident light 1706 is perpendicularly incident. In a case of FIG. 17A in which the angle of incidence is large, a transmission wavelength shifts to a short wavelength side in comparison to a case of FIG. 17B in which the angle of incidence is small. At this time, light 1704 and 1707 of wavelengths that are not transmitted are reflected or absorbed by the optical element. In other words, a state in which with perpendicular incidence, R light is incident on the image sensor changes when the angle of incidence becomes large to that in which B light is incident on the image sensor.

Figure 17C:
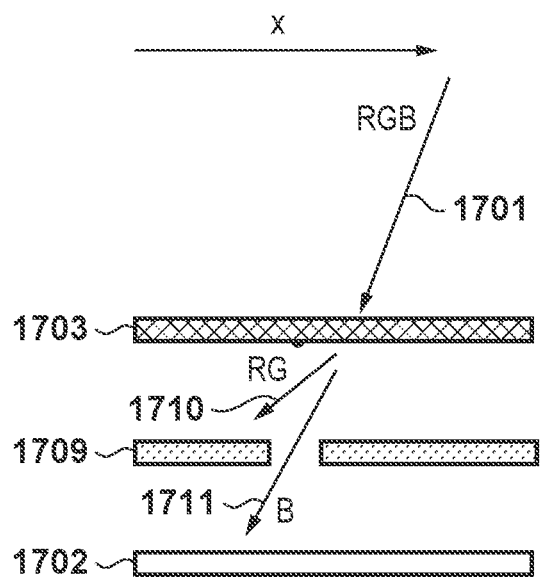
Figure 17D:
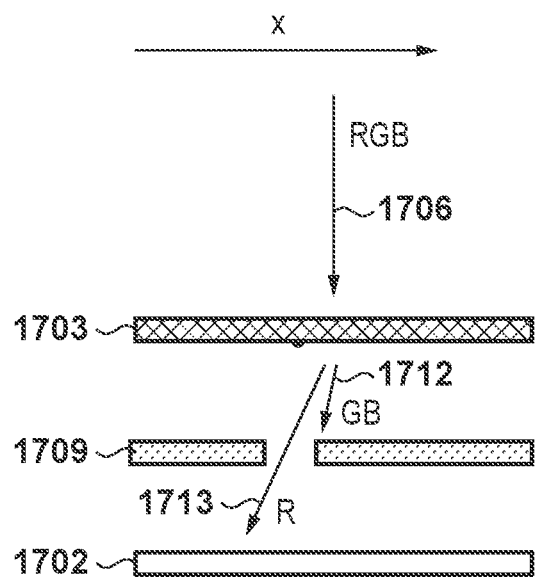

FIG. 17C and FIG. 17D illustrate examples in which a combination of an optical element (e.g., a diffraction grating) having a spectral characteristic, and a light-shielding film and an opening portion thereof according to the present embodiment is used. FIG. 17C illustrates a relation between the incident light 1701, the optical element 1703, the image sensor 1702, and a light-shielding film 1709 in a case where a beam is incident, for example, 15° on an element having a spectral characteristic. FIG. 17D illustrates a case where incident light 1706 is perpendicularly incident. Regarding the light-shielding film, an opening is arranged at a position that is at an incline of, for example, 30° from a position of incidence of incident light on the optical element and transmits only a beam of that angle. In other words, a state in which with perpendicular incidence, R light is incident on the image sensor changes when the angle of incidence is large to that in which B light is incident on the image sensor. As described above, in a case where the target of interest is the angle of incidence and an input to the image sensor, even if the configuration is as illustrated in FIG. 17C and FIG. 17D, it is possible to realize the same function as in the cases of FIG. 17A and FIG. 17B. Note that in order to prevent the occurrence of error due to widening of the incident position of incident light, configuration may be such that F number of the imaging optical system is increased (i.e., decrease the opening diameter) as much as possible.

The relation between the angle of incidence of a beam, an opening position of the light-shielding film, and transmission wavelength will be described with reference to FIGS. 18 and 19. The transmission wavelength of a transmissive type diffraction grating can be expressed as in Equation (10) assuming that the angle of incidence onto the diffraction grating is α, the emergence angle is β, the grating period is d, and the degree is m.

$$d(\sin \alpha - \sin \beta) = m\lambda \tag{10}$$

Figure 18:
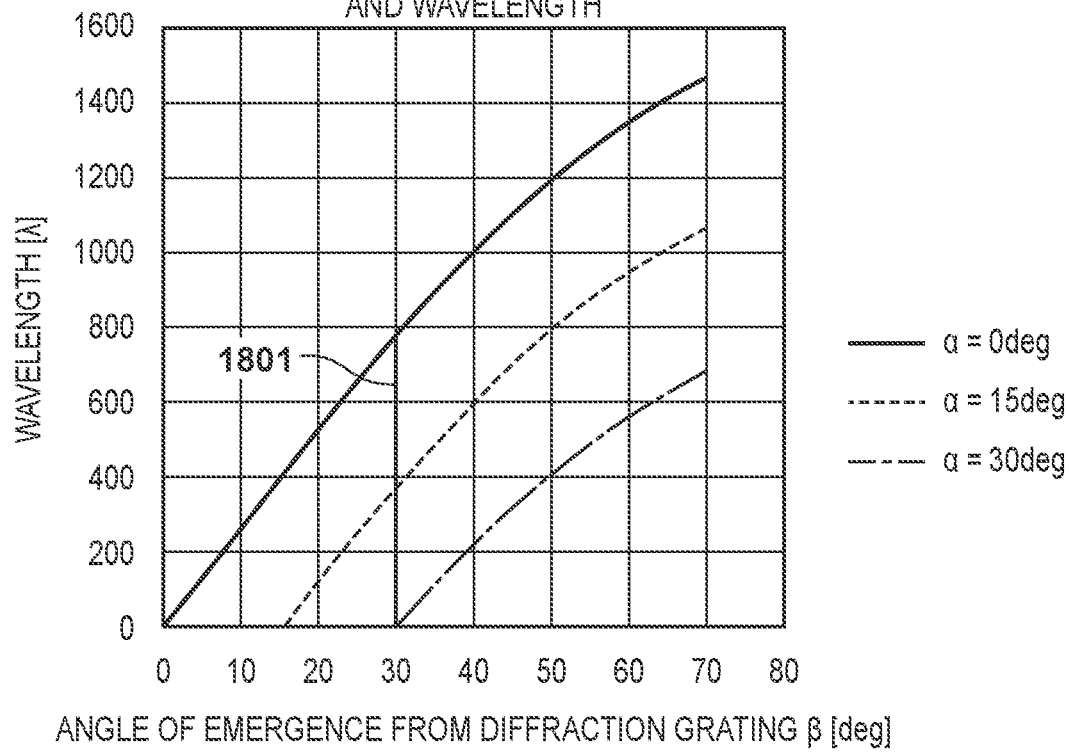
FIG. 18 is a view describing an example an optical characteristic of a diffraction grating according to the third embodiment.
Figure 19:
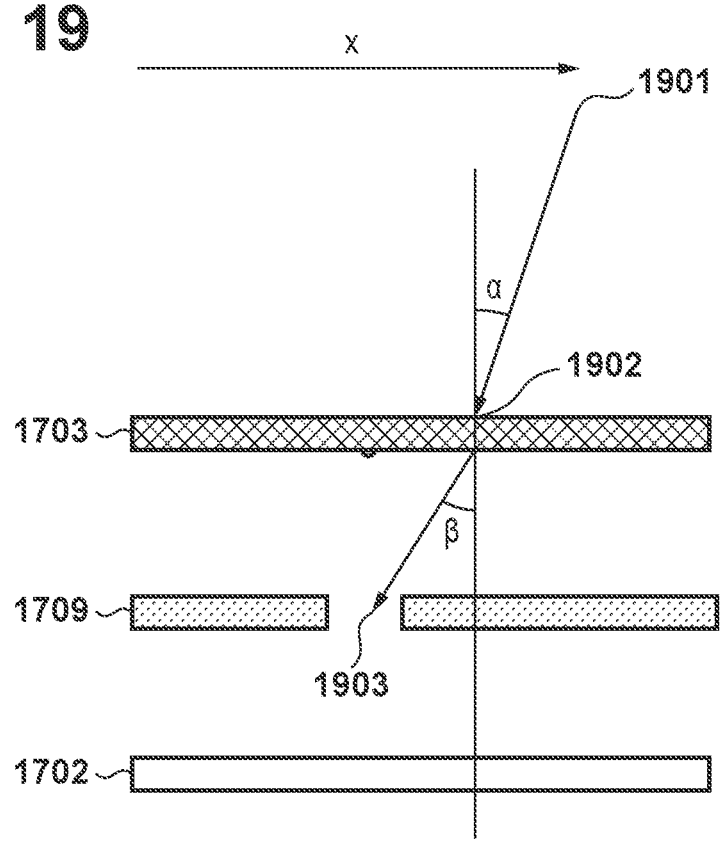
FIG. 19 is a view describing a relation between an opening and a transmission wavelength of a light-shielding film according to the third embodiment.

The relation between β and λ in a case where incidence angle α of Equation (9) is set to 0°, 15°, and 30° is illustrated in the graph of FIG. 18. The grating period d is set as 1600 nm, and the degree m is set as −1. When the target of interest is the position at which β is 30°, it is known that λ changes in a range of 0 to 800 nm by α changing from 0° to 30°. The relation between the installation position of the opening in the light-shielding film and the transmission wavelength will be described using FIG. 19. β in the graph of FIG. 18 is an angle of emergence from the diffraction grating and fixing β at 30° means to arrange an opening 1903 in the light-shielding film at a position 30° from an incident position 1902 of incident light 1901 on the optical element. Fixing β and changing α corresponds to moving along a line 1801 of FIG. 18, and changing the angle of incidence α onto the optical element 1703 changes the wavelength that is incident on the image sensor 1702.

The combination of an optical element having a spectral characteristic and a light-shielding film can be applied to a case where an imaging optical system or an image sensor is shifted as in the first embodiment as well as to a case where a crop position of an image sensor is changed as in the second embodiment.

As described above, in the present embodiment, a beam transmitted through an optical element and a light-shielding film is captured using a combination of the optical element having a spectral characteristic and the light-shielding film, and an image having a pixel value for each transmission wavelength band and spatial coordinate is acquired. This makes it possible to change a spectral characteristic that an image sensor receives by not only an optical characteristic on the image sensor but also the position and the form of the light-shielding film, and an increase in the freedom of design makes it possible to easily achieve the desired performance.

Fourth Embodiment

In the first to third embodiments, an example of a case where the positional relationship of the imaging optical system and the image sensor (or a crop position at which an image signal is outputted) is in a relation that shifted in parallel was described. For example, by shifting the imaging optical system and the image sensor, a change of the angle of incidence of a beam onto the image sensor was realized without changing the angle of view. Meanwhile, in the present embodiment, a configuration in which the angle of incidence onto the image sensor is changed without a large change in the angle of view using a tilt of the imaging optical system rather than a parallel shift of the imaging optical system and the image sensor will be described. Note that in the present embodiment, the internal configuration of the image capturing unit 101 is different from the first embodiment; however, the configuration of the image capturing apparatus 100 illustrated in FIG. 1 may be the same.

In FIG. 20, a reference numeral 2002 is an imaging optical system and a reference numeral 2003 is an image sensor. An optical element such as a multilayer film or photonic crystal having an incidence angle dependence is arranged in or directly over the image sensor. Assume that optical arrangements of the imaging optical system 2002 and the image sensor 2003 with respect to a subject 2001 are $C_{-n}$, $C_0$, and $C_{+n}$, respectively. $C_{-n}$ to $C_0$ to $C_{+n}$ are in a relation in which the imaging optical system is tilted with respect to the image sensor and has a total of 2n+1 arrangements.

When the image sensor 2003 acquires an image, the imaging optical system 2002 is tilted with respect to the image sensor 2003 so as not to change the position of the subject 2001. Configuration may be taken so as to perform tilting, stop tilting, shoot, and then start tilting again or shoot while continuously tilting.

The 2n+1 images shot at each arrangement of $C_{-n}$ to $C_0$ to $C_{+n}$ whose transmission characteristic bands in the left and right of the imaging surface are assumed to be B0 to B2n are illustrated as reference numerals 2004 to 2006. While B0 is a band at an arrangement of a perpendicular incidence, a transmission characteristic band shifts toward a short wavelength side the closer the band is to B2n.

In the following, the reference numerals 2004 to 2006 illustrated in FIG. 20 can be treated to be the same as the reference numerals 704 to 706 of FIG. 7 in the first embodiment. In other words, similarly to the first embodiment, it is possible to realize an image capturing apparatus capable of freely adjusting a wavelength range and resolution by way of moving the image capturing apparatus 100.

It is considered that in a case where the lens is tilted, a depth of field may be different within the imaging surface; however, that will not be much of a problem so long as a combination is that of an image sensor that has a deep depth of field and is small in size, and an imaging optical system. With a wide-angle lens, a misalignment of images are likely to occur due to a change in perspective; however, such effects can be reduced by setting the imaging optical system to a telephoto side or shooting a plurality of times at different angles of view.

As described above, in the present embodiment, an image having a pixel value for each transmission wavelength band and spatial coordinate is acquired by capturing a beam transmitted through an optical element having an incidence angle dependence while changing the relative angle of the imaging optical system and the image sensor in accordance with the position of the image capturing apparatus 100. Such a configuration makes it possible to reduce the necessary image circle in comparison to a case where the imaging optical system is shifted, whereby it becomes possible to downsize the lens. In other words, there is a merit of being able to downsize the size of the image capturing apparatus itself As described above, in the above-described embodiment, configuration is taken so as to receive a beam whose wavelength that reaches a light-receiving surface is different in accordance with the angle of incidence of a reflected light among the reflected light from a subject that is incident via an imaging optical system and generate an image signal by an image capturing unit. Also, configuration is taken so as to change a state of the imaging optical system or the image capturing unit (i.e., a shift position or angle of the imaging optical system, or crop position) such that a second image signal is generated by a beam whose angle of incidence is different from that of a beam by which a first image signal is generated. Also, configuration is taken so as to generate a spectral image based on a plurality of image signals generated by receiving beams in each changed state of the imaging optical system or the image capturing unit. This makes it possible to reduce limitation on wavelength resolution (the number of bands) and obtain spectral information using a simple configuration.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-144874, filed Aug. 28, 2020 which is hereby incorporated by reference herein in its entirety.

What is claimed is:

1. An image capturing apparatus comprising:
   an image sensor configured to receive beams of reflected light from a subject incident via an imaging optical system whose wavelength that reaches a light-receiving surface is different in accordance with an angle of incidence of reflected light, and generate an image signal;
   one or more processors; and
   a memory configured to store instructions which, when the instructions are executed by the one or more processors, cause the image capturing apparatus to function as:
      a control unit that changes a state of the imaging optical system or the image sensor such that a second image signal is generated by beams for which the angle of incidence of the reflected light from the imaging optical system is different from the beams by which a first image signal is generated, wherein the control unit includes a driving unit that changes a relative position or direction between in optical system and the image sensor so as to change the angle of incidence of the reflected light from the imaging optical system; and
      an output unit that outputs a spectral image based on a plurality of the image signals generated by receiving the beams in each state of the imaging optical system or the image sensor changed by the control unit,
   wherein the driving unit changes the relative position between the imaging optical system and the image sensor by a shift amount by moving at least one of the imaging optical system and the image sensor on a plane that is parallel to the light-receiving surface, the shift amount being defined based on a subject distance of the subject.

2. The image capturing apparatus according to claim 1, wherein the shift amount is defined based on the subject distance of the subject, a pupil distance of the imaging optical system, and a movement amount from a predetermined position of the image capturing apparatus.

3. The image capturing apparatus according to claim 1, wherein the driving unit moves the imaging optical system or the image sensor to the relative position between the imaging optical system and the image sensor set in accordance with a desired range of wavelengths in the spectral image.

4. The image capturing apparatus according to claim 3, wherein resolution of the desired wavelengths in the spectral image is different in accordance with the number of image signals generated in a range in which the relative position is changed.

5. The image capturing apparatus according to claim 1, wherein the spectral image has a signal value for each unit specified by a spatial coordinate that corresponds to the light-receiving surface and a wavelength.

6. The image capturing apparatus according to claim 1, wherein the image sensor includes an optical element whose wavelength of a beam to be transmitted is different in accordance with the angle of incidence of the reflected light.

7. The image capturing apparatus according to claim 6, wherein the optical element is arranged on the image sensor that receives the beam.

8. The image capturing apparatus according to claim 6, wherein the optical element is configured by a dielectric multilayer film.

9. The image capturing apparatus according to claim 6, wherein the optical element is configured by a photonic crystal.

10. The image capturing apparatus according to claim 6, wherein the optical element is configured by a plasmonic crystal.

11. The image capturing apparatus according to claim 1, wherein a characteristic receiving the beam whose wavelength that reaches the light-receiving surface is different in accordance with the angle of incidence of the reflected light includes an angular dependency related to an angle of incidence in a two-dimensional direction with respect to a plane that is parallel to the light-receiving surface.

12. The image capturing apparatus according to claim 1, wherein the angle of incidence of the beam that reaches the light-receiving surface is configured to be approximately linear in relation to the shift amount.

13. The image capturing apparatus according to claim 1, wherein the angle of incidence of the beam that reaches the light-receiving surface is configured to be approximately linear in relation to a position of the light-receiving surface.

14. A method of controlling an image capturing apparatus that includes an image sensor operable to receive beams whose wavelength that reaches a light-receiving surface is different in accordance with an angle of incidence of reflected light among the reflected light from a subject incident via an imaging optical system, and generate an image signal, the method comprising:
   controlling to change a state of the imaging optical system or the image sensor such that a second image signal is generated by beams whose angle of incidence of the reflected light from the imaging optical system is different from beams by which a first image signal is generated, wherein the controlling to change the state of the imaging optical system or the image sensor includes changing a relative position or direction between the imaging optical system and the image sensor so as to change the angle of incidence of the reflected light from the imaging optical system; and
   outputting a spectral image based on a plurality of the image signals generated by receiving the beams in each state of the imaging optical system or the image sensor changed by the control unit,
   wherein the relative position between the imaging optical system and the image sensor is changed by a shift amount by moving at least one of the imaging optical system and the image sensor on a plane that is parallel to the light-receiving surface, the shift amount being defined based on a subject distance of the subject.

15. A non-transitory computer-readable storage medium comprising instructions for performing a method of controlling an image capturing apparatus that includes an image sensor operable to receive beams whose wavelength that reaches a light-receiving surface is different in accordance with an angle of incidence of reflected light among the reflected light from a subject incident via an imaging optical system, and generate an image signal, the method comprising:

controlling to change a state of the imaging optical system or the image sensor such that a second image signal is generated by beams whose angle of incidence of the reflected light from the imaging optical system is different from beams by which a first image signal is generated, wherein the controlling to change the state of the imaging optical system or the image sensor includes changing a relative position or direction between the imaging optical system and the image sensor so as to change the angle of incidence of the reflected light from the imaging optical system; and outputting a spectral image based on a plurality of the image signals generated by receiving the beams in each state of the imaging optical system or the image sensor changed by the control unit, wherein the relative position between the imaging optical system and the image sensor is changed by a shift amount by moving at least one of the imaging optical system and the image sensor on a plane that is parallel to the light-receiving surface, the shift amount being defined based on a subject distance of the subject.

* * * * *